(12) United States Patent
Schoenbrodt et al.

(10) Patent No.: US 11,492,521 B2
(45) Date of Patent: Nov. 8, 2022

(54) SELF-ADHERING SEALING DEVICE WITH AN ADHESIVE LAYER ARRANGEMENT

(71) Applicant: SIKA TECHNOLOGY AG, Baar (CH)

(72) Inventors: Simon Schoenbrodt, Sarnen (CH); Robert Roskamp, Altdorf (CH); Matia Bulloni, Aranno (CH); Herbert Ackermann, Tann (CH); Frank Hoefflin, Baden (CH); Carine Kerber, Sarnen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 17/263,421

(22) PCT Filed: Aug. 27, 2019

(86) PCT No.: PCT/EP2019/072887
§ 371 (c)(1),
(2) Date: Jan. 26, 2021

(87) PCT Pub. No.: WO2020/043741
PCT Pub. Date: Mar. 5, 2020

(65) Prior Publication Data
US 2021/0309891 A1    Oct. 7, 2021

(30) Foreign Application Priority Data
Aug. 27, 2018   (EP) ..................... 18191016

(51) Int. Cl.
*C09J 7/38* (2018.01)
*B32B 5/02* (2006.01)
(Continued)

(52) U.S. Cl.
CPC ............... *C09J 7/385* (2018.01); *B32B 5/022* (2013.01); *B32B 7/14* (2013.01); *B32B 27/12* (2013.01);
(Continued)

(58) Field of Classification Search
CPC ...................................................... E04B 1/665
See application file for complete search history.

(56) References Cited

U.S. PATENT DOCUMENTS 4,656,062 A * 4/1987 Harriett .................. B32B 27/20
427/397.8
2005/0043468 A1    2/2005  Fisher

FOREIGN PATENT DOCUMENTS

| EP | 0164197 A2 | 12/1985 |
| EP | 0729986 A2 | 9/1996 |
| WO | 2015/127562 A1 | 9/2015 |

OTHER PUBLICATIONS

Nov. 11, 2019 Search Report issued in International Patent Application No. PCT/EP2019/072887.
(Continued)

*Primary Examiner* — Ian A Rummel
(74) *Attorney, Agent, or Firm* — Oliff PLC

(57) ABSTRACT

A sealing device including a waterproofing membrane, a sealant layer covering at least a portion of the second primary exterior surface of the waterproofing membrane and an adhesive layer covering a portion of the outer major surface of the sealant layer facing away from the second primary exterior surface of the waterproofing membrane, wherein the sealant layer is composed of an adhesive sealant composition comprising at least one elastomer, at least one at 25° C. liquid polyolefin resin, and at least one inert mineral filler. A method produces a sealing device, a method waterproofs a substrate, and a waterproofed substrate.

19 Claims, 6 Drawing Sheets

(51) Int. Cl.
    *B32B 27/12*     (2006.01)
    *B32B 27/32*     (2006.01)
    *B32B 7/14*      (2006.01)
    *B32B 37/12*     (2006.01)
    *B32B 37/18*     (2006.01)
    *B32B 38/00*     (2006.01)
    *E04B 1/66*      (2006.01)
    *E04D 5/10*      (2006.01)
    *C09J 7/24*      (2018.01)
    *C09J 7/35*      (2018.01)

(52) U.S. Cl.
    CPC .......... *B32B 27/32* (2013.01); *B32B 37/1292* (2013.01); *B32B 37/182* (2013.01); *B32B 38/0008* (2013.01); *C09J 7/243* (2018.01); *C09J 7/35* (2018.01); *E04B 1/665* (2013.01); *E04D 5/10* (2013.01); *B32B 2255/02* (2013.01); *B32B 2255/26* (2013.01); *B32B 2255/28* (2013.01); *B32B 2264/10* (2013.01); *B32B 2305/30* (2013.01); *B32B 2305/72* (2013.01); *B32B 2307/7265* (2013.01); *B32B 2419/00* (2013.01); *B32B 2419/06* (2013.01); *B32B 2581/00* (2013.01); *C09J 2301/122* (2020.08); *C09J 2301/204* (2020.08); *C09J 2301/208* (2020.08); *C09J 2301/302* (2020.08); *C09J 2301/408* (2020.08); *C09J 2400/10* (2013.01); *C09J 2423/046* (2013.01); *C09J 2433/00* (2013.01)

(56) References Cited

OTHER PUBLICATIONS

Nov. 11, 2019 Written Opinion issued in International Patent Application No. PCT/EP2019/072887.

* cited by examiner

SELF-ADHERING SEALING DEVICE WITH AN ADHESIVE LAYER ARRANGEMENT

TECHNICAL FIELD

The invention relates to the field of waterproofing of underground and above ground building constructions by using self-adhering sealing devices. In particular, the invention relates to self-adhering waterproofing membranes, which can be used for providing fully adhered waterproofing and roof systems.

BACKGROUND OF THE INVENTION

In the field of construction polymeric sheets, which are often referred to as waterproofing or roofing membranes, are used to protect underground and above ground constructions, such as basements, tunnels, and flat and low-sloped roofs, against penetration water. Waterproofing membranes are applied, for example, to prevent ingress of water through cracks that develop in the concrete structure due to building settlement, load deflection or concrete shrinkage. Roofing membranes used for waterproofing of flat and low-sloped roof structures can be provided as single-ply or multi-ply membrane systems. In a single-ply system, the roof substrate is covered using a roofing membrane composed of a single waterproofing layer, which is typically reinforced with a reinforcement layer, such as a layer of fiber material. In multi-ply systems, a roofing membrane composed of multiple waterproofing layers of different or similar materials are used. Single-ply membranes have the advantage of lower production costs compared to the multi-ply membranes but they are also less resistant to mechanical damages cause by punctures of sharp objects.

Commonly used materials for waterproofing and roofing membranes include plastics, in particular thermoplastics such as plasticized polyvinylchloride (p-PVC), thermoplastic olefins (TPE-O, TPO), and elastomers such as ethylene-propylene diene monomer (EPDM). The membranes are typically delivered to a construction site in rolls, transferred to the place of installation, unrolled, and adhered to the substrate to be waterproofed. The substrate on which the membrane is adhered may be comprised of variety of materials depending on the installation site. The substrate may be, for example, a concrete, metal, or wood deck, or it may include an insulation board or recover board and/or an existing membrane.

In roofing applications, the waterproofing membranes must be securely fastened to the roof substrate to provide sufficient mechanical strength to resist the shearing forces applied on it due to high wind loads. Roof systems are typically divided into two categories depending on the means used for fastening the roofing membrane to roof substrate. In a mechanically attached roof system, the roofing membrane is fastened to the roof substrate by using screws and/or barbed plates. Mechanical fastening enables high strength bonding but it provides direct attachment to the roof substrate only at locations where a mechanical fastener affixes the membrane to the surface, which makes mechanically attached membranes susceptible to flutter. In fully-adhered roof systems the membrane is typically adhered to the roof substrate indirectly by using an adhesive composition.

Waterproofing and roofing membranes can be adhesively adhered to various substrates by using a number of techniques such as by contact bonding or by using self-adhering membranes. In contact bonding both the membrane and the surface of the substrate are first coated with a solvent or water based contact adhesive after which the membrane is contacted with the surface of the substrate. The volatile components of the contact adhesive are "flashed off" to provide a partially dried adhesive film prior to contacting the membrane with the substrate. A fully-adhered roof system can also be prepared by using self-adhering membranes comprising a pre-applied layer of adhesive composition coated on the surface of the membrane. Typically the pre-applied adhesive layer is covered with a release liner to prevent premature unwanted adhesion and to protect the adhesive layer from moisture, fouling, and other environmental factors. At the time of use the release liner is removed and the membrane is secured to the substrate without using additional adhesives. Self-adhering membranes having a pre-applied adhesive layer covered by release liner are also known as "peel and stick membranes".

In order to create a continuous waterproofing seal, the edges of adjacent membranes are overlapped to form sealable joints. These joints can then be sealed by bonding the bottom surface an overlapping edge to the top surface of another overlapping edge or by using sealing tapes bridging the gap between top surfaces of both overlapping edges. The technique for bonding the overlapping surfaces of the adjacent membranes depends on the materials used in the membranes. In case of membranes composed of thermoplastic or non-crosslinked elastomeric materials, the overlapping portions of adjacent membranes can be bonded to each other by heat-welding. In case of self-adhering membranes, an area near the lengthwise edges of the membrane is typically left free of adhesive in order to enable joining of the overlapping edges by heat-welding. The overlapping portions can also be bonded to each other by using an adhesive, which can be same or different than the adhesive as used for bonding the membrane to the substrate.

The State-of-the-Art self-adhering waterproofing and roofing membranes typically include a fiber-based separation layer between the waterproofing layer and the adhesive layer to ensure sufficient mechanical stability and long term compatibility of the adhesive and the waterproofing layer. The presence of the additional separation layer increases the production costs of the membrane. Furthermore, the seams between overlapping edges of adjacent membranes are typically sealed by heat-welding or by using special sealing tapes, both of which increase the installation time and eventually the costs of installation.

There thus remains a need for a self-adhering sealing device, which can be produced at lower cost than the State-of-the-Art self-adhering waterproofing and roofing membranes and which enables providing fully-adhered waterproofing and roof systems with decreased cost and reduced installation time.

SUMMARY OF THE INVENTION

The object of the present invention is to provide a self-adhering sealing device, which can be used for sealing underground and above ground constructions against penetration of water.

Another object of the present invention is to provide a self-adhering sealing device, which can be used for providing fully-adhered waterproofing and roof systems, in which the seams between overlapping edges of adjacent membranes are adhesively bonded to each other.

The subject of the present invention is a sealing device as defined in claim 1.

It was surprisingly found out that a sealing device comprising a waterproofing membrane and superimposed sealant and adhesive layers having the compositions as defined in claim 1 is able to solve or at least mitigate the problems of the State-of-the-Art self-adhering sealing devices. In particular, it was surprisingly found out that such sealing devices provide unique combination of high initial (green) strength and long term adhesive bond strength, which cannot be achieved with the State-of-the-Art sealing devices.

One of the advantages of the self-adhering sealing device of the present invention is that it enables providing fully-adhered waterproofing and roof systems with lower production and installation costs compared to the State-of-the-Art sealing devices.

Another advantage of the self-adhering sealing device of the present invention is that enables providing fully-adhered waterproofing and roof systems, in which the seams between overlapping edges of adjacent sealing devices are adhesively bonded to each other using the same adhesive as that used for bonding of the sealing device to the surface of the substrate.

Other subjects of the present invention are presented in other independent claims. Preferred embodiments of the invention are presented in the dependent claims.

DETAILED DESCRIPTION OF THE INVENTION

Figure 1:
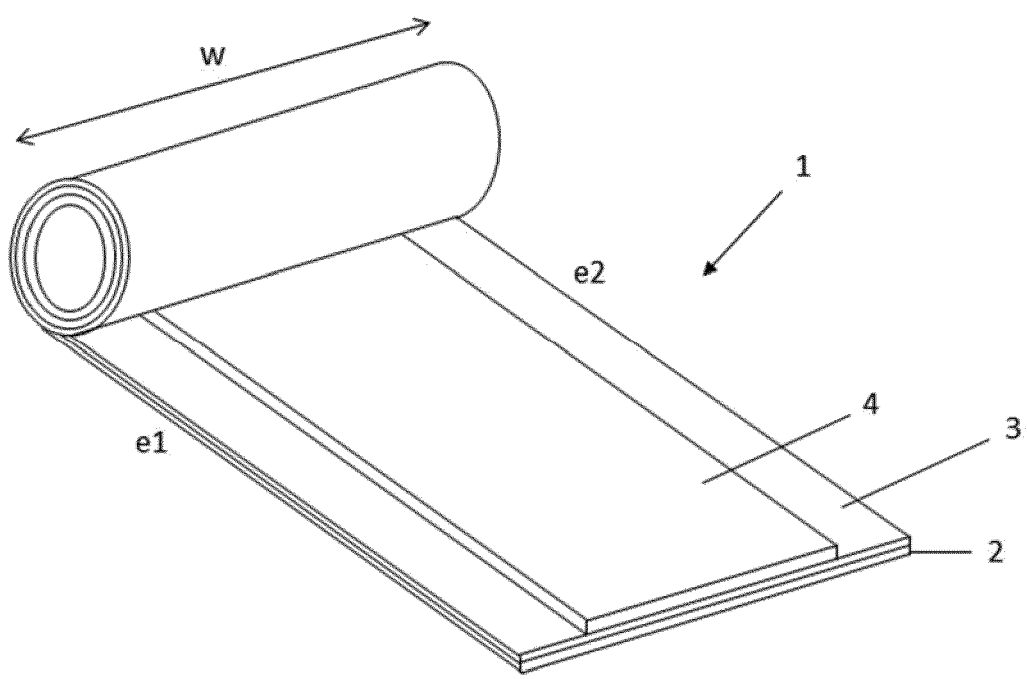
FIG. 1 shows a perspective view of the sealing device (1) comprising a waterproofing membrane (2) having a width (w) defined between opposite longitudinally extending edges (e1, e2), a sealant layer (3) covering a portion of the second primary exterior surface of the waterproofing membrane (2) and an adhesive layer (4) covering a portion of the outer major surface of the sealant layer (3).

The subject of the present invention is sealing device (1), in particular a self-adhering sealing device, comprising:
i. A waterproofing membrane (2) having a first and a second primary exterior surface and a width (w) defined between opposite longitudinally extending edges (e1, e2),
ii. A sealant layer (3) covering at least a portion of the second primary exterior surface of the waterproofing membrane (2), and
iii. An adhesive layer (4) covering a portion of the outer major surface of the sealant layer (3), wherein the sealant layer (3) is composed of an adhesive sealant composition comprising:
a) At least one elastomer,
b) At least one at 25° C. liquid polyolefin resin, and
c) At least one inert mineral filler.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "elastomer" refers to any polymer or combination of polymers, which is capable of recovering from large deformations. Typical elastomers are capable of being elongated or deformed to at least 200% of their original dimension under an externally applied force, and will substantially resume the original dimensions, sustaining only small permanent set (typically no more than about 20%), after the external force is released. As used herein, the term "elastomer" may be used interchangeably with the term "rubber." In particular, the term "elastomer" refers to elastomers that are not chemically crosslinked. The term "chemically crosslinked" is understood to mean that the polymer chains forming the elastomer are inter-connected by a plurality of covalent bonds, which are stable mechanically and thermally.

The term "(meth)acrylic" designates methacrylic or acrylic. Accordingly, (meth)acryloyl designates methacryloyl or acryloyl. A (meth)acryloyl group is also known as (meth)acryl group. A (meth)acrylic compound can have one or more (meth)acryl groups, such as mono- di-, tri- etc. functional (meth)acrylic compounds.

The term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight may be determined by gel permeation chromatography.

The term "softening point" refers to a temperature at which compound softens in a rubber-like state, or a temperature at which the crystalline portion within the compound melts. The softening point can be determined by ring and ball measurement conducted according to DIN EN 1238 standard.

The term "melting temperature" refers to a crystalline melting point ($T_m$) as determined by differential scanning calorimetry (DSC) by using the method as defined in ISO 11357 standard using a heating rate of 2° C./min. The measurements can be performed with a Mettler Toledo DSC 3+ device and the $T_g$ values can be determined from the measured DSC-curve with the help of the DSC-software.

The term "glass transition temperature" ($T_g$) designates the temperature above which temperature a polymer component becomes soft and pliable, and below which it becomes hard and glassy. The glass transition temperature can be determined by differential scanning calorimetry method (DSC) according to ISO 11357 standard using a heating rate of 2° C./min. The measurements can be performed with a Mettler Toledo DSC 3+ device and the $T_g$ values can be determined from the measured DSC-curve with the help of the DSC-software.

The "amount or content of at least one component X" in a composition, for example "the amount of the at least one thermoplastic polymer" refers to the sum of the individual amounts of all thermoplastic polymers contained in the composition. Furthermore, in case the composition comprises 20 wt.-% of at least one thermoplastic polymer, the sum of the amounts of all thermoplastic polymers contained in the composition equals 20 wt.-%.

The term "room temperature" designates a temperature of 23° C.

The waterproofing membrane is preferably a sheet-like element having first and second primary exterior surfaces, a width (w) defined between longitudinally extending edges (e1, e2), and a thickness defined between the primary exterior surfaces. The term "sheet-like element" refers in the present disclosure an element having a length and width at least 5 times, preferably at least 25 times, more preferably at least 50 times greater than the thickness of the element. The waterproofing membrane can be composed of a single layer or of multiple layers of similar or different materials having different resistance to penetration of liquid water and/or humidity.

There are no particular limitations for the width and length of the sealing device and the waterproofing membrane and these depend on the intended use of the sealing device. For example, the sealing device can be provided in form of a narrow strip having a width, for example, in the range of 10-500 mm, such as 50-350 mm, in particular 75-250 mm. These types of sealing devices are suitable for use, for example, as sealing tapes. Furthermore, the sealing device can also be provided in form of a membrane having a width, for example, in the range of 750-3,000 mm, such as 1,000-2,500 mm, in particular 1,000-2,000 mm. These types of sealing devices are suitable for use, for example, as roofing membranes.

The term "primary exterior surface of the waterproofing membrane" refers to the outermost surfaces of the waterproofing membrane. For example, in case the waterproofing membrane is a fiber layer-backed membrane composed of a waterproofing layer having first and second major surfaces and a layer of fiber material adhered on the second major surface of the waterproofing layer, the first major surface of the waterproofing layer constitutes the first primary exterior surface and the outer major surface of the layer of fiber material facing away from the waterproofing layer forms the second primary exterior surface of the waterproofing membrane. The term "longitudinally extending edges" refers in the present disclosure to the edges, which extend in the lengthwise direction of a sheet-like element.

The term "outer major surface of the sealant layer" refers in the present disclosure the major surface of the sealant layer, which faces away from the second primary exterior surface of the waterproofing membrane. The term "major surface of a layer" refers to the top and bottom surfaces of the layer defining the thickness of the layer there between. Furthermore, the term "outer major surface of the adhesive layer" refers in the present disclosure to the major surface of the adhesive layer, which faces away from the outer major surface of the sealant layer.

The sealant layer is preferably coated directly on the second primary exterior surface of the waterproofing membrane, i.e. the sealant layer and the waterproofing membrane are preferably directly connected to each other over their opposing surfaces. The expression "directly connected" is understood to mean in the context of the present invention that no further layer or substance is present between the layers and that the opposing surfaces of the layers are directly bonded to each other or adhere to each other. At the transition area between the two layers, the materials of the layers can also be present mixed with each other. Furthermore, the adhesive layer is preferably coated directly on the outer major surface of the sealant layer, i.e. the adhesive layer and the sealant layer are preferably directly connected to each other over their opposing surfaces.

Preferably, sealant layer is in a form of a continuous layer of the adhesive sealant composition. The term "continuous layer" refers in the present document to layers consisting of one single area coated with the respective composition. In contrast, a "discontinuous layer" is considered to consist of two or more areas coated with the respective composition, which areas are not connected to each other to form a single continuous layer.

Preferably, the sealant layer covers at least 50%, more preferably at least 65%, most preferably at least 75% of the second primary exterior surface of the waterproofing membrane. According to one or more embodiments, the sealant layer covers substantially the entire area of the second primary exterior surface of the waterproofing membrane. The expression "substantially entire area" is understood to mean that at least 85%, preferably at least 90%, more preferably at least 95%, most preferably at least 97.5% of the area is covered with the sealant layer. Furthermore, it may be preferable, for example due to production technical reasons, that narrow segments on the second primary exterior surface of the waterproofing membrane near the longitudinal edges of the membrane and having a width of 1-2 mm are not covered with the sealant layer.

Preferably, the adhesive layer covers at least 5%, more preferably at least 10%, even more preferably at least 15%, most preferably at least 25% of the outer major surface of the sealant layer. According to one or more embodiments, the adhesive layer covers 5-90%, preferably 15-85%, more preferably 20-85%, even more preferably 25-85%, in particular 25-80%, most preferably 30-75% of the outer major surface of the sealant layer.

The adhesive layer may be in form of a continuous or discontinuous layer of an adhesive. According to one or more embodiments, the adhesive layer consists of a single adhesive segment coated on the outer major surface of the sealant layer.

According to one or more further embodiments, the adhesive layer consists of two or more continuous, longitudinally or transversely extending adhesive stripes coated on the on the outer major surface of the sealant layer. The expressions "longitudinally" and "transversely" refer to the directions along the length and width of the waterproofing membrane. The expression "continuous adhesive stripe" is understood to mean that each adhesive stripe covers an area, which extends continuously from one peripheral edge of the waterproofing membrane to the other opposite peripheral edge. For example, in case of continuous, transversely extending adhesive stripes, each adhesive stripe covers an area, which extends between the longitudinal edges (e1, e2) of the waterproofing membrane. The continuous adhesive stripes are preferably separated from each other by a distance of at least 5%, preferably at least 15%, more preferably at least 25% of the width of each stripe.

According to one or more embodiments, the adhesive layer consists of two or more continuous, longitudinally extending rectangular adhesive stripes coated on the on the outer major surface of the sealant layer. According to one or more further embodiments, the adhesive layer consists of two or more continuous, transversely extending rectangular adhesive stripes coated on the on the outer major surface of the sealant layer.

The width of the adhesive stripes is not particularly restricted and the width may also vary along the length of the stripes. It is also possible that some adhesive stripes have a smaller or greater width than the other adhesive stripes. For example, it may be advantageous that in case of continuous longitudinally extending adhesive stripes, the adhesive stripes that are closer to the longitudinal edges (e1, e2) of the waterproofing membrane have a smaller width than the adhesive stripes near the center of the waterproofing membrane, or vice versa. In case of continuous transversely extending adhesive stripes, the adhesive stripes preferably have the same width. According to one or more embodiments, each continuous, longitudinally or transversely extending adhesive stripe has a width corresponding to 2.5-25%, preferably 5-15% of the total width (w) of the waterproofing membrane.

According to one or more further embodiments, the adhesive layer consists of discontinuous spaced-apart adhesive segments coated on the outer major surface of the sealant layer. The expression "spaced-apart" is understood to mean that discontinuous adhesive segments are completely isolated from each other, i.e. each adhesive segment is surrounded from all sides by an area substantially free from said adhesive. The discontinuous spaced-apart adhesive segments can have any conventional shape, for example, circular, square, hexagonal, rectangular, polygonal, parallelogram, rhomboidal, or oval shape. Preferably, the minimum distance between two adjacent discontinuous spaced-apart adhesive segments, before the adhesive layer has been contacted with a surface of a substrate, is not less than 0.5 mm, more preferably not less than 1.0 mm, even more preferably not less than 1.5 mm.

The discontinuous spaced-apart adhesive segments can be uniformly distributed or their density can become reduced or increased in the longitudinal and/or transverse direction of the waterproofing membrane. Preferably, the discontinuous spaced-apart adhesive segments are uniformly distributed. Furthermore, the discontinuous spaced-apart adhesive segments can be configured such that they line up in rows or such that they are offset between rows.

The discontinuous spaced-apart adhesive segments can have substantially same size or their size can become reduced or increased in the longitudinal or transverse direction of the waterproofing membrane. By "substantially same size" is meant here that the percentage difference between sizes of any discontinuous spaced-apart adhesive segments is not more than 35%, preferably, more preferably not more than 25%, even more preferably not more than 15%, most preferably not more than 5%.

It may be preferable that the size of discontinuous spaced-apart adhesive segments is in the range of 50-10,000 $mm^2$, more preferably 100-5,000 $mm^2$, even more preferably 150-2,500 $mm^2$, most preferably 250-1,500 $mm^2$. The term "size of adhesive segment" refers here to the size of the area on the outer major surface of the sealing layer covered by an individual adhesive segment. According to one or more embodiments, the average size of the discontinuous spaced-apart adhesive segment is in the range of 50-10,000 $mm^2$, more preferably 100-5,000 $mm^2$, even more preferably 150-2,500 $mm^2$, most preferably 250-1,500 $mm^2$. The term "average size" designates the arithmetic average of the sizes.

According to one or more embodiments, the discontinuous spaced-apart adhesive segments have a square or rectangular shape and/or the discontinuous spaced-apart adhesive segments line up in rows in longitudinal and/or transverse direction of the waterproofing membrane and/or the distance between two discontinuous adjacent spaced-apart adhesive segments is at least 0.5 mm, preferably at least 1.0 mm, more preferably at least 1.5 mm and/or the average size of the discontinuous spaced-apart adhesive segments is in the range of 100-5,000 $mm^2$, preferably 150-2,500 $mm^2$, more preferably 250-1,500 $mm^2$.

According to one or more embodiments, the adhesive layer is partially embedded into to the sealant layer. The term "partially embedded" is understood to mean that the plane of the outer major surface of the adhesive layer coincides with or lies above the plane of the outer major surface of the sealant layer. According to one or more embodiments, not more than 25%, preferably not more than 20%, more preferably not more than 15%, most preferably not more than 5%, of the thickness of the adhesive layer extends beyond the plane of the outer major surface of the sealant layer.

The thickness of the sealant layer and adhesive layer are not particularly restricted. Generally, the thickness of these layers should be high enough to provide the sealing device with sufficient peel strength from surfaces of typical waterproofing and roofing substrates. According to one or more embodiments, the sealant layer has a maximum thickness, determined by using the measurement method as defined in DIN EN 1849-2 standard, of 0.1-5.0 mm, preferably 0.5-3.0 mm. According to one or more embodiments, the adhesive layer has a maximum thickness, determined by using the measurement method as defined in DIN EN 1849-2 standard, of 0.1-5.0 mm, preferably 0.5-3.0 mm. In case of a discontinuous adhesive layer, the term "thickness of the adhesive layer" is understood to mean the arithmetic average of the thicknesses of the continuous adhesive stripes or the discontinuous spaced-apart adhesive segments. Preferably, the continuous adhesive stripes or the discontinuous spaced-apart adhesive segments have substantially the same thickness, i.e. the difference between thicknesses of any two continuous adhesive stripes or discontinuous spaced-apart adhesive segments is not more than 25%, more preferably not more than 15%, even more preferably not more than 10%, most preferably not more than 5%.

According to one or more embodiments, the sealing device further comprises a release liner covering at least a portion of the outer major surface of the sealant layer and/or at least a portion of the outer major surface of the adhesive layer.

The release liner may be used to prevent premature unwanted adhesion and to protect the exterior surface of the sealing device from moisture, fouling, and other environmental factors. In case the sealing device is provided in form of rolls, the release liner enables ease of unwind without sticking of the sealant layer and/or the adhesive layer to the back side of the sealing device. The release liner may be sliced into multiple sections to allow portioned detachment of the liner from the exterior surface of the sealing device.

Suitable materials for the release liner include Kraft paper, polyethylene coated paper, silicone coated paper as well as polymeric films, for example, polyethylene, polypropylene, and polyester films coated with polymeric release agents selected from silicone, silicone urea, urethanes, waxes, and long chain alkyl acrylate release agents.

According to one or more embodiments, the adhesive sealant composition comprises:
a) 1-40 wt.-% of the at least one elastomer,
b) 10-60 wt.-% of the at least one at 25° C. liquid polyolefin resin, and
c) 5-65 wt.-% of the at least one inert mineral filler, all proportions being based on the total weight of the adhesive sealant composition.

The type of the at least one elastomer contained in the adhesive sealant composition is not particularly restricted. The at least one elastomer may be selected from the group consisting of ethylene-propylene rubber (EPR), butyl rubber, halogenated butyl rubber, ethylene-propylene diene monomer rubber (EPDM), natural rubber, chloroprene rubber, synthetic 1,4-cis-polyisoprene, polybutadiene, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer. Term "ethylene-propylene rubber (EPR)" designates in the present disclosure elastomeric copolymers of ethylene and propylene whereas the term "ethylene-propylene diene monomer (EPDM)" rubber refers to elastomeric terpolymers comprising 15-70 wt.-%, preferably 20-45 wt.-% of propylene, 20-80 wt.-% of ethylene, and 2-15 wt.-% of a diene, for example, 1,4-hexadiene, norbornadiene, ethylidene-norbornene, dicyclopentadiene, butadiene, or isoprene.

According to one or more embodiments, the at least one elastomer is selected from the group consisting of ethylene-propylene rubber (EPR), butyl rubber, synthetic 1,4-cis-polyisoprene, polybutadiene, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer, preferably from the group consisting of ethylene-propylene rubber (EPR), butyl rubber, synthetic 1,4-cis-polyisoprene, polybutadiene, styrene-butadiene copolymer, isoprene-butadiene copolymer, and styrene-isoprene-butadiene rubber, more preferably from the group consisting of ethylene-propylene rubber (EPR), butyl rubber, synthetic 1,4-cis-polyisoprene, and polybutadiene.

It is furthermore preferred that the at least one elastomer is not chemically crosslinked.

According to one or more embodiments, the at least one elastomer is present in the adhesive sealant composition in an amount of 5-40 wt.-%, preferably 7.5-35 wt.-%, more preferably 10-30 wt.-%, even more preferably 10-25 wt.-%, still more preferably 10-22.5 wt.-%, based on the total weight of the adhesive sealant composition.

According to one or more embodiments, the at least one at 25° C. liquid polyolefin resins is selected from the group consisting of at 25° C. liquid polybutene and polyisobutylene. The term "at 25° C. liquid polybutene" refers in the present document to low molecular weight olefin oligomers comprising isobutylene and/or 1-butene and/or 2-butene. The ratio of the $C_4$-olefin isomers can vary by manufacturer and by grade. When the C4-olefin is exclusively 1-butene, the material is referred to as "poly-n-butene" or "PNB". The term "at 25° C. liquid polyisobutylene" refers in the present document to low molecular weight polyolefins and olefin oligomers of isobutylene, preferably containing at least 75 wt.-%, more preferably at least 85 wt.-% of repeat units derived from isobutylene. Suitable at 25° C. liquid polybutene and polyisobutylene have an average molecular weight ($M_n$) of less than 15,000 g/mol, preferably less than 5,000 g/mol, more preferably less than 3,000 g/mol, still more preferably less than 2,500 g/mol, even more preferably less than 1,000 g/mol.

Suitable commercially available at 25° C. liquid polybutenes and polyisobutylenes include, for example, Indopol® H-300 and Indopol® H-1200 (from Ineos); Glissopal® V230, Glissopal® V500, and Glissopal® V700 (from BASF); Dynapak® poly 230 (from Univar GmbH, Germany); and Daelim® PB 950 (from Daelim Industrial).

According to one or more embodiments, the at least one at 25° C. liquid polyolefin resin is selected from the group consisting of at 25° C. liquid polybutenes and at 25° C. liquid polyisobutylenes, preferably having an average molecular weight ($M_n$) of not more than 5,000 g/mol, more preferably not more than 3,000 g/mol, even more preferably not more than 2,500 g/mol and/or a polydispersity index ($M_w/M_n$), determined by GPC, of not more than 5, preferably in the range of 0.5-5.0, more preferably 1.0-4.5, even more preferably 1.0-3.5, still more preferably 1.25-3.0.

According to one or more embodiments, the at least one at 25° C. liquid polyolefin resin is at 25° C. liquid polybutene, preferably having an average molecular weight ($M_n$) of not more than 5,000 g/mol, more preferably not more than 2,500 g/mol, even more preferably not more than 2,000 g/mol, still more preferably not more than 1,500 g/mol and/or a polydispersity index ($M_w/M_n$), determined by GPC, of not more than 5, preferably in the range of 0.5-5.0, more preferably 1.0-4.5, even more preferably 1.0-3.5, still more preferably 1.25-2.5.

According to one or more embodiments, the at least one at 25° C. liquid polyolefin resin is at 25° C. liquid polyisobutylene, preferably containing at least 75 wt.-%, more preferably at least wt.-85% of repeat units derived from isobutylene, based on the weight of the at least one polyisobutylene, and preferably having an average molecular weight ($M_n$) of not more than 5,000 g/mol, more preferably not more than 3,000 g/mol, even more preferably not more than 2,750 g/mol and/or a polydispersity index ($M_w/M_n$), determined by GPC, of not more than 5, preferably in the range of 0.5-5.0, more preferably 1.0-4.5, even more preferably 1.0-3.5, still more preferably 1.25-2.5.

According to one or more embodiments, the at least one at 25° C. liquid polyolefin resin is present in the adhesive sealant composition in an amount of 5-55 wt.-%, preferably 10-55 wt.-%, more preferably 15-55 wt.-%, even more preferably 20-50 wt.-%, still more preferably 25-45 wt.-%, such as 30-45 wt.-%, based on the total weight of the adhesive sealant composition.

The term "inert mineral filler" designates in the present document mineral fillers, which, unlike mineral binders, do not undergo a hydration reaction in the presence of water. Preferably the at least one inert mineral filler is selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

The term "sand" refers in the present document to mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%. The term "calcium carbonate" as inert mineral filler refers in the present document to calcitic fillers produced from chalk, limestone or marble by grinding and/or precipitation.

According to one or more embodiments, the at least one inert mineral filler is present in the adhesive sealant composition in an amount of 10-75 wt.-%, preferably 10-70 wt.-%, more preferably 10-60 wt.-%, even more preferably 20-60 wt.-%, still more preferably 30-55 wt.-%, in particular 35-55 wt.-%, based on the total weight of the adhesive sealant composition. According to one or more further embodiments, the at least one inert mineral filler is present in the adhesive sealant composition in an amount of 25-80 wt.-%, preferably 30-75 wt.-%, more preferably 35-75 wt.-%, even more preferably 40-75 wt.-%, still more preferably 40-75 wt.-%, based on the total weight of the adhesive sealant composition.

According to one or more embodiment, the adhesive sealant composition comprises less than 20 wt.-%, more preferably less than 15 wt.-%, even more preferably less than 10 wt.-%, most preferably less than 5 wt.-%, most preferably less than 2.5 wt.-% of water-swellable mineral fillers, based on the total weight of the adhesive sealant composition.

The term "water-swellable mineral filler" refers in the present disclosure to mineral fillers that are capable of swelling upon contact with water, i.e. mineral fillers that swell in the presence of water. Examples of water-swellable mineral fillers include, in particular, water-swellable clays, such as montmorillonite clays, for example calcium montmorillonite, sodium montmorillonite, calcium bentonite, and sodium bentonite.

Clays in general are layered hydrous aluminum phyllosilicates containing a crystal structure consisting of Al—OH or Fe—OH or Mg—OH octahedral layer, sandwiched between two Si—O tetrahedral sheets, and exchangeable interlayer cations. The nature of the exchangeable interlayer cations determines the characteristics of the clay. In case of a water-swellable clay, the exchangeable cations are hydratable upon contacting the clay with water. When the exchangeable cations are hydrated and water molecules are able to enter the space between the structure layers, the distance and volume between the two layers increases leading to swelling of the clay.

According to one or more embodiments, the adhesive sealant composition comprises less than 20 wt.-%, preferably less than 15 wt.-%, more preferably less than 10 wt.-%, even more preferably less than 5 wt.-%, still more preferably less than 2.5 wt.-% of montmorillonite clays selected from the group consisting of calcium bentonite, and sodium bentonite, based on the total weight of the adhesive sealant composition. According to one or more further embodiments, the adhesive sealant composition comprises less than 20 wt.-%, preferably less than 15 wt.-%, more preferably less than 10 wt.-%, even more preferably less than 5 wt.-%, still more preferably less than 2.5 wt.-% of montmorillonite clays selected from the group consisting of calcium montmorillonite, sodium montmorillonite, calcium bentonite, and sodium bentonite, based on the total weight of the adhesive sealant composition.

According to one or more further embodiments, the adhesive sealant composition is essentially free of water-swellable clays. The term "essentially free" is understood to mean that the amount of water-swellable clays is not more than 2.5 wt.-%, preferably not more than 1.5 wt.-%, more preferably not more than 1.0 wt.-%, even more preferably not more than 0.5 wt.-%, based on the total weight of the adhesive sealant composition. According to one or more embodiments, the adhesive sealant composition is essentially free of montmorillonite clays selected from the group consisting of calcium bentonite, and sodium bentonite, preferably selected from the group consisting of calcium montmorillonite, sodium montmorillonite, calcium bentonite, and sodium bentonite.

According to one or more embodiments, the adhesive sealant composition comprises at least one at 25° C. solid hydrocarbon resin. Suitable hydrocarbon resins to be used in the adhesive sealant composition include synthetic resins, natural resins, and chemically modified natural resins. According to one or more embodiments, the at least one at 25° C. solid hydrocarbon resin has a softening point measured by Ring and Ball method according to DIN EN 1238 in the range of 65-200° C., preferably 75-160° C., more preferably 75-150° C., even more preferably 85-140° C. and/or a glass transition temperature ($T_g$) determined by differential scanning calorimetry method (DSC) according to ISO 11357 standard using a heating rate of 2° C./min of at or above 0° C., more preferably at or above 15° C., even more preferably at or above 30° C., still more preferably at or above 45° C.

It may be preferable that the at least one at 25° C. solid hydrocarbon resin is present in the adhesive sealant composition in an amount of not more than 40 wt.-%, more preferably not more than 30 wt.-%, based on the total weight of the adhesive sealant composition. According to one or more embodiments, the at least one at 25° C. solid hydrocarbon resin is present in the adhesive sealant composition in an amount of 0.5-30 wt.-%, preferably 1-25 wt.-%, more preferably 1.5-22.5 wt.-%, even more preferably 2.5-20 wt.-%, still more preferably 2.5-15 wt.-%, such as 1-10 wt.-%, based on the total weight of the adhesive sealant composition.

Examples of suitable natural resins and chemically modified natural resins include rosins, rosin esters, phenolic modified rosin esters, and terpene resins. The term "rosin" is to be understood to include gum rosin, wood rosin, tall oil rosin, distilled rosin, and modified rosins, for example dimerized, hydrogenated, maleated and/or polymerized versions of any of these rosins.

Suitable terpene resins include copolymers and terpolymers of natural terpenes, such as styrene/terpene and alpha methyl styrene/terpene resins; polyterpene resins obtainable from the polymerization of terpene hydrocarbons, such as the bicyclic monoterpene known as pinene, in the presence of Friedel-Crafts catalysts at moderately low temperatures; hydrogenated polyterpene resins; and phenolic modified terpene resins including hydrogenated derivatives thereof.

The term "synthetic resin" refers in the present document to compounds obtained from the controlled chemical reactions such as polyaddition or polycondensation between well-defined reactants that do not themselves have the characteristic of resins. Monomers that may be polymerized to synthesize the synthetic resins may include aliphatic monomer, cycloaliphatic monomer, aromatic monomer, or mixtures thereof. Aliphatic monomers can include $C_4$, $C_5$, and $C_6$ paraffins, olefins, and conjugated diolefins. Examples of aliphatic monomers or cycloaliphatic monomers include butadiene, isobutylene, 1,3-pentadiene, 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomers can include $C_8$, $C_9$, and $C_{10}$ aromatic monomer, such as styrene, indene, derivatives of styrene, derivatives of indene, coumarone and combinations thereof.

In particular, suitable synthetic resins include synthetic hydrocarbon resins made by polymerizing mixtures of unsaturated monomers that are obtained as by-products of cracking of natural gas liquids, gas oil, or petroleum naphthas. Synthetic hydrocarbon resins obtained from petroleum based feedstocks are referred in the present document as "petroleum hydrocarbon resins". These include also pure monomer aromatic resins, which are made by polymerizing aromatic monomer feedstocks that have been purified to eliminate color causing contaminants and to precisely control the composition of the product. Petroleum hydrocarbon resins typically have a relatively low average molecular weight ($M_n$), such in the range of 250-5,000 g/mol and a glass transition temperature ($T_g$) of above 0° C., preferably equal to or higher than 15° C., more preferably equal to or higher than 30° C.

It may be preferable that the at least one at 25° C. solid hydrocarbon resin is selected from the group consisting of C5 aliphatic petroleum hydrocarbon resins, mixed C5/C9 aliphatic/aromatic petroleum hydrocarbon resins, aromatic modified C5 aliphatic petroleum hydrocarbon resins, cycloaliphatic petroleum hydrocarbon resins, mixed C5 aliphatic/cycloaliphatic petroleum hydrocarbon resins, mixed C9 aromatic/cycloaliphatic petroleum hydrocarbon resins, mixed C5 aliphatic/cycloaliphatic/C9 aromatic petroleum hydrocarbon resins, aromatic modified cycloaliphatic petroleum hydrocarbon resins, and C9 aromatic petroleum hydrocarbon resins as well hydrogenated versions of the aforementioned resins. The notations "C5" and "C9" indicate that the monomers from which the resins are made are predominantly hydrocarbons having 4-6 and 8-10 carbon atoms, respectively. The term "hydrogenated" includes fully, substantially and at least partially hydrogenated resins. Partially hydrogenated resins may have a hydrogenation level, for example, of 50%, 70%, or 90%. According to one or more embodiments, the at least one at 25° C. solid hydrocarbon resin is an aliphatic C5/C9 petroleum hydrocarbon resin.

The adhesive sealant composition may further comprise one or more auxiliary additives selected from UV absorbers, UV stabilizers, heat stabilizers, antioxidants, flame retardants, optical brighteners, pigments, dyes, and biocides. The auxiliary additives, if used at all, preferably comprise not more than 25 wt.-%, more preferably not more than 15 wt.-%, even more preferably not more than 10 wt.-%, most preferably not more than 5 wt.-%, of the total weight of the adhesive sealant composition.

According to one or more embodiments, the adhesive layer is composed of a pressure sensitive adhesive (PSA) composition, preferably of a hot-melt pressure sensitive adhesive (HM-PSA) composition. The term "pressure sensitive adhesive (PSA)" refers in the present disclosure to viscoelastic materials, which adhere immediately to almost any kind of substrates by application of light pressure and which are permanently tacky. The term "hot-melt pressure sensitive adhesive" designates in the present disclosure pressure sensitive adhesives that can be applied as a melt.

Suitable pressure sensitive adhesive compositions and hot-melt pressure sensitive adhesive compositions include adhesive compositions based on acrylic polymers, styrene block copolymers, amorphous polyolefins (APO), amorphous poly-alpha-olefins (APAO), vinyl ether polymers, bitumen, and elastomers such as, for example, styrene-butadiene rubber (SBR), ethylene propylene diene monomer (EPDM) rubber, butyl rubber, polyisoprene, polybutadiene, natural rubber, polychloroprene rubber, ethylene-propylene rubber (EPR), nitrile rubber, acrylic rubber, ethylene vinyl acetate rubber, and silicone rubber. In addition to the above mentioned polymers, suitable pressure sensitive adhesive compositions typically comprise one or more additional components including, for example, tackifying resins, waxes, and plasticizers as well as additives, for example, UV-light absorption agents, UV- and heat stabilizers, optical brighteners, pigments, dyes, and desiccants.

According to one or more embodiments, the adhesive layer is composed of pressure sensitive adhesive composition comprising:

A) 5-65 wt.-% of at least one polymer component,
B) 10-80 wt.-% of at least one tackifying resin,
C) 0-60 wt.-% of at least one inert mineral filler,
D) 0-30 wt.-% of at least one plasticizer, all proportions being based on the total weight of the pressure sensitive adhesive composition.

According to one or more embodiments, the at least one polymer component is a styrene block copolymer. Suitable styrene block copolymers include block copolymers of the SXS type, in each of which S denotes a non-elastomer styrene (or polystyrene) block and X denotes an elastomeric α-olefin block, which may be polybutadiene, polyisoprene, polyisoprene-polybutadiene, completely or partially hydrogenated polyisoprene (poly ethylene-propylene), completely or partially hydrogenated polybutadiene (poly ethylene-butylene). The elastomeric α-olefin block preferably has a glass transition temperature in the range from −55° C. to −35° C. The elastomeric α-olefin block may also be a chemically modified α-olefin block. Particularly suitable chemically modified α-olefin blocks include, for example, maleic acid-grafted α-olefin blocks and particularly maleic acid-grafted ethylene-butylene blocks.

Preferably, the at least one styrene block copolymer is selected from the group consisting of SBS, SIS, SIBS, SEBS, and SEPS block copolymers. These can have a linear, radial, diblock, triblock, or star structure, the linear structure being preferred. Suitable styrene block copolymers of the SXS type include block copolymers based on saturated or unsaturated middle blocks X. Hydrogenated styrene block copolymers are also suitable.

According to one or more further embodiments, the at least one polymer component is an elastomer, preferably selected from the group consisting of styrene-butadiene rubber (SBR), ethylene propylene diene monomer (EPDM)

rubber, butyl rubber, polyisoprene, polybutadiene, natural rubber, polychloroprene rubber, ethylene-propylene rubber (EPR), nitrile rubber, acrylic rubber, and ethylene vinyl acetate rubber.

According to one or more embodiments, the at least one polymer component is present in the pressure sensitive adhesive composition in an amount of 5-60 wt.-%, preferably 10-55 wt.-%, more preferably 15-55 wt.-%, most preferably 20-50 wt.-%, based on the total weight of the pressure sensitive adhesive composition.

The term "tackifying resin" designates in the present document resins that in general enhance the adhesion and/or tackiness of an adhesive composition. The term "tackiness" designates in the present document the property of a substance of being sticky or adhesive by simple contact. The tackiness can be measured, for example, as a loop tack. Preferred tackifying resins are tackifying at a temperature of 25° C. According to one or more embodiments, the at least one tackifying resin is present in the pressure sensitive adhesive composition in an amount of 10-75 wt.-%, preferably 15-70 wt.-%, more preferably 20-65 wt.-%, most preferably 25-60 wt.-%, based on the total weight of the pressure sensitive adhesive composition.

The at least one tackifying resin is preferably selected from the group consisting of natural resins, chemically modified natural resins, and hydrocarbon petroleum resins. According to one or more embodiments, the at least one tackifying resin has an average molecular weight ($M_n$) of 250-5,000 g/mol, preferably 250-3,500 g/mol and/or a glass transition temperature ($T_g$) of above 0° C., preferably equal to or higher than 15° C. and/or a softening point measured by Ring and Ball method according to DIN EN 1238 standard of 65-200° C., preferably 75-160° C., more preferably 85-140° C.

According to one or more embodiments, the at least one inert mineral filler is present in the pressure sensitive adhesive composition on an amount of 5-60 wt.-%, preferably 10-55 wt.-%, more preferably 10-50 wt.-%, even more preferably 15-45 wt.-%, based on the total weight of the pressure sensitive adhesive composition.

The at least one inert mineral filler is preferably selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

According to one or more further embodiments, the pressure sensitive adhesive composition is a bituminous pressure sensitive adhesive composition. Bituminous pressure sensitive adhesive compositions are well known to a person skilled in the art. These types of adhesives typically comprise polymer modified bitumen as the main component and various additives such as processing oils and fillers. Suitable processing oils include, for example, mineral oils, synthetic oils, and paraffins. The term "mineral oil" refers to any hydrocarbon liquid of lubricating viscosity (i.e. having a kinematic viscosity at 100° C. of 1 cSt or more) derived from petroleum crude oil and subjected to one or more refining and/or hydroprocessing steps, such as fractionation, hydrocracking, dewaxing, isomerization, and hydrofinishing, to purify and chemically modify the components to achieve a final set of properties. Mineral oils can be characterized as either "paraffinic", "naphthenic", or "aromatic" based on the relative content of paraffinic, naphthenic, and aromatic moieties therein. Bituminous pressure sensitive adhesives can be prepared by melting bitumen and mixing the other constituents into the thus obtained molten bitumen mass.

The bitumen component contained in the bituminous pressure sensitive adhesive composition is typically modified with one or more polymers in order to improve the mechanical properties of the adhesive composition. Typical polymers used in bituminous pressure sensitive adhesive compositions include, for example, atactic polypropylenes (APP), amorphous polyolefins (APO), styrene block copolymers, in particular SIS, SBS, and SEBS block copolymers as well as rubbers, for example, styrene-butadiene rubber (SBR), ethylene propylene diene monomer (EPDM) rubber, polyisoprene, polybutadiene, natural rubber, polychloroprene rubber, ethylene-propylene rubber (EPR), nitrile rubbers, and acrylic rubbers. The term "amorphous polyolefin" refers to a polyolefin having a degree of crystallinity of less than 30% measured by differential scanning calorimetry (DSC) conducted according to the method as defined in ISO 11357 standard. Suitable amorphous polyolefins (APO) include, for example, homopolymers of propylene and copolymers of propylene with one or more α-olefin comonomer, such as, for example, ethylene, 1-butene, 1-hexene, 1-octene and 1-decene.

According to one or more embodiments, the bituminous pressure sensitive adhesive composition comprises 15-95 wt.-%, preferably 25-90 wt.-%, more preferably 35-85 wt.-% of bitumen and 5-35 wt.-%, preferably 10-30 wt.-%, more preferably 10-25 wt.-% of at least one polymer selected from the group consisting of atactic polypropylenes (APP), amorphous polyolefins (APO), styrene block copolymers, styrene-butadiene rubber (SBR), ethylene propylene diene monomer (EPDM) rubber, polyisoprene, polybutadiene, natural rubber, polychloroprene rubber, ethylene-propylene rubber (EPR), nitrile rubbers, and acrylic rubbers and 0-40 wt.-%, preferably 0-35 wt.-% of at least one processing oil, preferably at least one mineral oil, all proportions being based on the total weight of the bituminous pressure sensitive adhesive composition. The pressure sensitive bituminous adhesive composition may further comprise not more than 60 wt.-%, preferably not more than 55 wt.-%, more preferably not more than 45 wt.-%, based on the total weight of the bituminous pressure sensitive adhesive composition, of at least one inert mineral filler, preferably selected from the group consisting of silica, calcium carbonate, talc, or clay.

According to one or more further embodiments, the pressure sensitive adhesive composition is an acrylic-based pressure sensitive adhesive composition comprising at least one acrylate polymer.

Suitable acrylate polymers include homopolymers, copolymers and higher inter-polymers of acrylic monomers optionally with one or more other ethylenically unsaturated monomers. Preferably, the acrylate polymer has been prepared by using a monomer mixture comprising at least 65 wt.-%, more preferably 75 wt.-%, most preferably 85 wt.-%, based on the total weight of the monomer mixture, of acrylic monomers of the following formula (I);

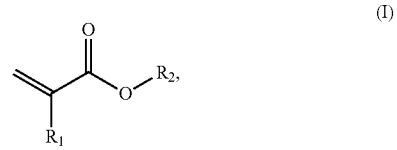

where $R_1$ is a hydrogen or a methyl group and $R_2$ is a hydrogen or an alkyl group having from 2 to 30, preferably from 2 to 9, carbon atoms. The alkyl groups are preferably selected from the group consisting of branched, unbranched, cyclic, acyclic, and saturated alkyl groups.

It may be preferable that the acrylate polymer is obtained by radical polymerization of a mixture comprising at least 65 wt.-%, more preferably 75 wt.-%, most preferably 85 wt.-%, based on the total weight of the mixture, of one or more acrylic monomers of the formula (I).

Examples of especially suitable acrylic monomers include, for example, methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, as for example isobutyl acrylate, 2-ethylhexyl acrylate, 2-ethylhexyl methacrylate, isooctyl acrylate, isooctyl methacrylate, and also cyclohexyl methacrylate, isobornyl acrylate, isobornyl methacrylate or 3,5-dimethyladamantyl acrylate.

It may be preferable that the mixture from which the at least one acrylate polymer is prepared further comprises up to 15 wt.-%, preferably at least 35 wt.-%, of comonomers in the form of vinyl compounds, preferably one or more vinyl compounds selected from the group consisting of vinyl esters, vinyl halides, vinylidene halides, ethylenically unsaturated hydrocarbons with functional groups, and nitriles of ethylenically unsaturated hydrocarbons. Acrylic compounds containing functional groups, for example, hydroxyl groups and hydroxyalkyl groups are also embraced by the term "vinyl compound". Suitable vinyl compounds include, for example, maleic anhydride, styrene, styrenic compounds, (meth)acrylamides, N-substituted (meth)acrylamides, acrylic acid, beta-acryloyloxypropionic acid, vinylacetic acid, fumaric acid, crotonic acid, aconitic acid, dimethylacrylic acid, trichloroacrylic acid, itaconic acid, vinyl acetate, hydroxyalkyl (meth)acrylate, amino-group-containing (meth)acrylates, and hydroxyl group-containing (meth)acrylates.

According to one or more further embodiments, the at least one acrylate polymer has been prepared by using a reactant mixture comprising:
a) at least 65 wt.-%, preferably at least 75 wt.-%, of one or more acrylic monomers of the formula (I) where $R_1$ is a hydrogen or a methyl group and $R_2$ is an alkyl group having from 2 to 9, carbon atoms, and
b) 0-20 wt.-%, preferably 2.5-15 wt.-%, of at least one vinyl compound selected from the group consisting of (meth) acrylic acid, beta-acryloyloxypropionic acid, vinylacetic acid, fumaric acid, crotonic acid, aconitic acid, dimethylacrylic acid, trichloroacrylic acid, itaconic acid, vinyl acetate, and hydroxyalkyl (meth)acrylates.

It may be preferable that the at least one acrylate polymer has an average molecular weight ($M_n$) in the range of 50,000-1,000,000 g/mol, more preferably 100,000-750,000 g/mol, even more preferably 150,000-500,000 g/mol. Preferably, the at least one acrylate polymer has a glass transition temperature ($T_g$) determined by dynamical mechanical analysis (DMA) using an applied frequency of 1 Hz and a strain level of 0.1%, of below 0° C., more preferably below −10° C., even more preferably below −20° C.

According to one or more embodiments, the at least one acrylate polymer is present in the acrylic-based pressure sensitive adhesive composition in an amount of at least 65 wt.-%, preferably at least 70 wt.-%, more preferably at least 75 wt.-%, even more preferably at least 85 wt.-%, based on the total weight of the acrylic-based pressure sensitive adhesive composition. In addition to the at least one acrylate polymer, the acrylic-based pressure sensitive adhesive composition may further comprise tackifying resins, waxes, and plasticizers as wells as additives, for example, UV-light absorption agents, UV- and heat stabilizers, optical brighteners, pigments, dyes, and desiccants. Preferably, the amount such auxiliary components is not more than 20 wt.-%, more preferably not more than 15 wt.-%, even more preferably not more than 10 wt.-%, based on the total weight of the acrylic-based pressure sensitive adhesive composition.

According to one or more further embodiments, the pressure sensitive adhesive composition is an at least partially crosslinked acrylic-based pressure sensitive adhesive composition. These types of adhesives have been found out to be suitable for use in the sealing device of the present invention since they have a broader operating window in terms of minimum and maximum application temperature. In particular, such adhesives have been found out to maintain their adhesive strength at higher temperatures compared to non-crosslinked acrylic-based pressure sensitive adhesives. In addition, the acrylic-based crosslinked pressure sensitive adhesive compositions have been found out to allow adjustments in the formulation to achieve greater tackiness even at low temperatures.

It may be preferable that the pressure sensitive adhesive composition is an at least partially crosslinked composition of:
a') At least 65.0 wt.-%, preferably at least 85.0 wt.-%, of the at least acrylate polymer,
b') 0.01-5.0 wt.-%, preferably 0.1-1.0 wt.-%, of at least one curing agent,
c') 0.1-5.0 wt.-%, preferably 0.25-2.5 wt.-%, of at least one initiator, and
d') 0-30.0 wt.-%, preferably 5.0-20.0 wt.-%, of at least one tackifying resin, all proportions being based on the total weight of the composition.

The at least one curing agent is preferably a multifunctional acrylate selected from the group consisting of butanediol dimethacrylate, ethyleneglycol dimethacrylate, diethyleneglycol dimethacrylate, triethyleneglycol dimethacrylate, trimethylolpropane trimethacrylate, butanediol diacrylate, hexanediol diacrylate, trimethylolpropane triacrylate, and tripropyleneglycol diacrylate, trimethylolpropane ethoxy triacrylate, trimethylolpropane triacrylate, tripropylene glycol diacrylate, propylene glycol dimethacrylate, dipropylene glycol diacrylate, dipentaerythritol hydroxy pentaacrylate, neopentyl glycol propoxylate diacrylate, bisphenol A ethoxylate dimethacrylate, alkoxylated hexanediol diacrylate, ethoxylated bisphenol A diacrylate, ethoxylated bisphenol A dimethacrylate, ethoxylated trimethylolpropane triacrylate, propoxylated neopentyl glycol diacrylate, propoxylated glyceryl triacrylate, polybutadiene diacrylate, and polybutadiene dimethacrylate.

According to one or more embodiments, the pressure sensitive adhesive composition is an acrylic-based pressure sensitive adhesive composition that has been at least partially crosslinked by use of UV-radiation. In these embodiments, the at least one initiator c') contained in the cross-linkable composition is a photo initiator. Suitable photoinitiators include, for example, benzoin ethers, dialkoxyacetophenones, alpha-hydroxycyclohexyl aryl ketones, alpha-ketophenylacetate esters, benzyldialkylketals, chloro- and alkylthioxanthones and alpha-amino- and alpha-hydroxyalkyl aryl ketones.

Preferably, the sealing device has a peel resistance from a metal surface, measured by using the method as defined in EN DIN 1372 standard, of at least 15 N/50 mm, more preferably at least 25 N/50 mm, even more preferably at least 35 N/50 mm.

Preferably, the waterproofing membrane comprises a waterproofing layer having first and second major surfaces. The composition of the waterproofing layer is not particularly restricted. However, the waterproofing layer should be as waterproof as possible and not to decompose or be mechanically damaged even under prolonged influence of water or moisture. According to one or more embodiments, the waterproofing layer has an impact resistance measured according to EN 12691: 2005 standard of at least 200 mm, preferably at least 300 mm and/or a longitudinal and a transversal tensile strength measured at a temperature of 23° C. according to DIN ISO 527-3 standard of at least 5 MPa, preferably at least 7.5 MPa and/or a longitudinal and transversal elongation at break measured at a temperature of 23° C. according to DIN ISO 527-3 standard of at least 150%, preferably at least 250% and/or a water resistance measured according to EN 1928 B standard of 0.6 bar for 24 hours and/or a maximum tear strength measured according to EN 12310-2 standard of at least 50 N, preferably at least 100 N.

The waterproofing layer and the sealant layer can be directly or indirectly connected to each other over their opposing surfaces. The waterproofing layer and the sealant layer can be indirectly connected to each other via a connecting layer, such as a layer of fiber material. In case of a porous connecting layer, such as an open weave fabric, waterproofing layer and the sealant layer may be partially directly and partially indirectly connected to each other over their opposing surfaces.

Preferably, the waterproofing layer comprises at least one thermoplastic polymer, preferably selected from the group consisting of ethylene-vinyl acetate copolymer (EVA), ethylene-acrylic ester copolymers, ethylene-α-olefin copolymers, ethylene-propylene copolymers, propylene-α-olefin copolymers, propylene-ethylene copolymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB). According to one or more further embodiments, the at least one thermoplastic polymer is selected from the group consisting of low-density polyethylene, linear low-density polyethylene, high-density polyethylene, ethylene-vinyl acetate copolymer (EVA), ethylene-acrylic ester copolymers, ethylene-α-olefin copolymers, and ethylene-propylene copolymers, propylene-α-olefin copolymers, propylene-ethylene copolymers, polypropylene (PP).

According to one or more embodiments, the at least one thermoplastic polymer comprises at least one thermoplastic polyolefin. The expression "the at least one thermoplastic polymer comprises at least one thermoplastic polyolefin" is understood to mean that the waterproofing layer comprises one or more thermoplastic polyolefins as representative(s) of the at least one thermoplastic polymer.

Thermoplastic polyolefins (TPO), which are also known as thermoplastic olefin elastomers (TPE-O), are heterophase polyolefin compositions containing a high crystallinity base polyolefin and a low-crystallinity or amorphous polyolefin modifier. The heterophasic phase morphology consists of a matrix phase composed primarily of the base polyolefin and a dispersed phase composed primarily of the polyolefin modifier. Commercially available TPOs include reactor blends of the base polyolefin and the polyolefin modifier, also known as "in-situ TPOs" or "in-situ impact copolymers (ICP)", as well as physical blends of the aforementioned components. In case of a reactor-blend type of TPO, the components are produced in a single-step polymerization process or in a sequential polymerization process, wherein the components of the matrix phase are produced in a first reactor and transferred to a second reactor, where the components of the dispersed phase are produced and incorporated as domains in the matrix phase. A physical-blend type of TPO is produced by melt-mixing the base polyolefin with the polyolefin modifier each of which was separately formed prior to blending of the components.

Reactor-blend type TPOs comprising polypropylene as the base polymer are often referred to as "heterophasic propylene copolymers" whereas reactor-blend type TPOs comprising polypropylene random copolymer as the base polymer are often referred to as "heterophasic propylene random copolymers". Depending on the amount of the polyolefin modifier, the commercially available heterophasic propylene copolymers are typically characterized as polypropylene "in-situ impact copolymers (ICP)" or as "reactor-TPOs" or as "soft-TPOs". The main difference between these types of TPOs is that the amount of the polyolefin modifier is typically lower in ICPs than in reactor-TPOs and soft-TPOs, such as not more than 40 wt.-%, in particular not more than 35 wt.-%. Consequently, typical ICPs tend to have a lower xylene cold soluble (XCS) content determined according to ISO 16152 2005 standard as well as higher flexural modulus determined according to ISO 178: 2010 standard compared to reactor-TPOs and soft-TPOs.

Suitable TPOs are commercially available, for example, under the trade name Hifax®, Adflex® and Adsyl® (all from Lyondell Basell), such as Hifax® CA 10A, Hifax® CA 12A, and Hifax® CA 212 A and under the trade name of Borsoft® (from Borealis Polymers), such as Borsoft® SD233 CF.

The at least one thermoplastic polymer is preferably present in the waterproofing layer in an amount of at least 15 wt.-%, more preferably at least 25 wt.-%, most preferably at least 35 wt.-%, based on the total weight of the waterproofing layer. According to one or more embodiments, the at least one thermoplastic polymer is present in the waterproofing layer in an amount of at least 50 wt.-%, preferably at least 60 wt.-%, more preferably at least 70 wt.-%, most preferably at least 85 wt.-%, based on the total weight of the waterproofing layer.

The waterproofing layer can comprise, in addition to the at least one thermoplastic polymer, auxiliary components, for example, UV- and heat stabilizers, antioxidants, plasticizers, flame retardants, fillers, dyes, pigments such as titanium dioxide and carbon black, matting agents, antistatic agents, impact modifiers, biocides, and processing aids such as lubricants, slip agents, antiblock agents, and denest aids. The total amount of these auxiliary components is preferably not more than 35 wt.-%, more preferably not more than 25 wt.-%, most preferably not more than 15 wt.-%, based on the total weight of the waterproofing layer.

The further details of the waterproofing membrane depend on whether the sealing element is intended to be used in waterproofing or roofing applications. According to one or more embodiments, the waterproofing membrane further comprises a top-coating covering at least portion of the first major surface of the waterproofing layer. In these embodiments, the outer major surface of the top coating facing away from the first major surface of the waterproofing layer constitutes the first primary exterior surface of the waterproofing membrane. The top-coating may comprise UV-absorbers and/or thermal stabilizers to protect the waterproofing layer from damaging influence of sunlight. The top-coating may also comprise color pigments in order to provide the waterproofing layer with a desired color.

The thickness of the waterproofing layer also depends on the intended use of the sealing device. According to one or more embodiments, the waterproofing layer has a thickness, determined by using the measurement method as defined in DIN EN 1849-2 standard, of 0.1-5.0 mm, preferably 0.25-2.5 mm, even more preferably 0.35-2.0 mm, most preferably 0.5-1.5 mm.

According to one or more embodiments, the waterproofing membrane further comprises a layer of fiber material covering at least a portion of the second major surface of the waterproofing layer and positioned between the waterproofing layer and the sealant layer. The layer of fiber material may be used to ensure the mechanical stability of the waterproofing layer, when the sealing device is exposed to varying environmental conditions, in particular to large temperature fluctuations. In these embodiments, the outer major surface of the layer of fiber material facing away from the second major surface of the waterproofing layer forms the second primary exterior surface of the waterproofing membrane.

The term "fiber material" designates in the present document materials composed of fibers comprising or consisting of, for example, organic, inorganic or synthetic organic materials. Examples of organic fibers include, for example, cellulose fibers, cotton fibers, and protein fibers. Particularly suitable synthetic organic materials include, for example, polyester, homopolymers and copolymers of ethylene and/or propylene, viscose, nylon, and polyamides. Fiber materials composed of inorganic fibers are also suitable, in particular, those composed of metal fibers or mineral fibers, such as glass fibers, aramid fibers, wollastonite fibers, and carbon fibers. Inorganic fibers, which have been surface treated, for example, with silanes, may also be suitable. The fiber material can comprise short fibers, long fibers, spun fibers (yarns), or filaments. The fibers can be aligned or drawn fibers. It may also be advantageous that the fiber material is composed of different types of fibers, both in terms of geometry and composition.

Preferably, the layer of fiber material is selected from the group consisting of non-woven fabrics, woven fabrics, and non-woven scrims. According to one or more embodiments, the layer of fiber material is a non-woven fabric or a non-woven scrim. The term "non-woven fabric" designates in the present document materials composed of fibers, which are bonded together by using chemical, mechanical, or thermal bonding means, and which are neither woven nor knitted. Non-woven fabrics can be produced, for example, by using a carding or needle punching process, in which the fibers are mechanically entangled to obtain the non-woven fabric. In chemical bonding, chemical binders such as adhesive materials are used to hold the fibers together in a non-woven fabric.

The term "non-woven scrim" designates in the present document web-like non-woven products composed of yarns, which lay on top of each other and are chemically bonded to each other. Typical materials for non-woven scrims include metals, fiberglass, and plastics, in particular polyester, polypropylene, polyethylene, and polyethylene terephthalate (PET).

According to one or more embodiments, the layer of fiber material is a non-woven fabric, preferably a non-woven fabric having a mass per unit area of more than 500 g/m$^2$, preferably not more than 400 g/m$^2$. In particular, the layer of fiber material may be a non-woven fabric having a mass per unit area of 15-500 g/m2, preferably 20-400 g/m2, more preferably 20-350 g/m2, most preferably 25-300 g/m2.

According to one or more further embodiments, the layer of fiber material is a non-woven fabric having a mass per unit area of not more than 200 g/m$^2$, preferably not more than 150 g/m$^2$, in particular of 15-200 g/m$^2$, preferably 20-150 g/m$^2$, more preferably 25-125 g/m$^2$, even more preferably 30-100 g/m$^2$, most preferably 30-75 g/m$^2$. Such non-woven fabrics have been found out to enable the sealant layer to partially penetrate the layer of fiber material and to form an adhesive bond with the waterproofing layer.

Preferably, the non-woven fabric comprises synthetic organic and/or inorganic fibers. Particularly suitable synthetic organic fibers for the non-woven fabric include, for example, polyester fibers, polypropylene fibers, polyethylene fibers, nylon fibers, and polyamide fibers. Particularly suitable inorganic fibers for the non-woven fabric include, for example, glass fibers, aramid fibers, wollastonite fibers, and carbon fibers.

According to one or more embodiments, the non-woven fabric has as the main fiber component synthetic organic fibers, preferably selected from the group consisting of polyester fibers, polypropylene fibers, polyethylene fibers, nylon fibers, and polyamide fibers. According to one or more further embodiments, the non-woven fabric has as the main fiber component inorganic fibers, preferably selected from the group consisting of glass fibers, aramid fibers, wollastonite fibers, and carbon fibers, more preferably glass fibers.

The layer of fiber material and the waterproofing layer can be directly or indirectly connected to each other over at least part of their opposing surfaces. The layer of fiber material may, for example, be adhesively adhered or thermally bonded to the second major surface of the waterproofing layer. According to one or more embodiments, the layer of fiber material is partially embedded into the waterproofing layer. The expression "partially embedded" is understood to mean that a portion of the fibers of the layer of fiber material are embedded into the waterproofing layer, i.e. covered by the matrix of the waterproofing layer.

It may be preferable that the layer of fiber material covers at least 50%, more preferably at least 65%, most preferably at least 75% of the second major surface of the waterproofing layer. According to one or more embodiments, the layer of fiber material covers substantially the entire area of the second major surface of the waterproofing layer. Furthermore, it may be preferable, for example due to production technical reasons, that narrow segments near the longitudinal edges of the waterproofing layer and having a width of 1-2 mm are not covered with the layer of fiber material.

The waterproofing layer may further comprise a reinforcement layer, which is fully embedded into the waterproofing layer. The type of the reinforcement layer, if used, is not particularly restricted. For example, the reinforcement layers commonly used for improving the dimensional stability of thermoplastic roofing membranes can be used. Preferable reinforcement layers include non-woven fabrics, woven fabrics, and non-woven scrims, and combinations thereof. It may, however, be also possible or even preferred that the waterproofing layer does not contain any reinforcement layers, which are fully embedded into the waterproofing layer.

The waterproofing membrane may be a single- or a multi-ply membrane. The term "single-ply membrane" designates in the present document membranes comprising exactly one waterproofing layer whereas the term "multi-ply membrane" designates membranes comprising more than one waterproofing layers. The waterproofing layers of a multi-ply membrane may have similar or different compositions. Single- and multi-ply membranes are known to a person skilled in the art and they may be produced by any conventional means, such as by way of extrusion or co-extrusion, calendaring, or by spread coating.

According to one or more embodiments, the waterproofing membrane is a single-ply membrane comprising exactly one waterproofing layer. According to one or more further embodiments, the waterproofing membrane is a single-ply membrane comprising exactly one a waterproofing layer, wherein the waterproofing layer and the sealant layer are directly connected to each other over their opposing surfaces. In these embodiments, the second major surface of the waterproofing layer constitutes the second primary exterior surface of the waterproofing membrane. Waterproofing membranes used in these embodiments, wherein the second major surface of the waterproofing layer is not covered with a layer of fiber material, are also known as "bare-backed membranes". Furthermore, the single-ply membrane may comprise a top-coating covering at least part of the first major surface of the first waterproofing layer.

According to one or more further embodiments, the sealing device is a multi-ply membrane comprising a first and a second waterproofing layer having first and second major surfaces, wherein the second waterproofing layer and the sealant layer are preferably directly connected to each other over their opposing surfaces. In these embodiments, the second major surface of the second waterproofing layer constitutes the second primary exterior surface of the waterproofing membrane. The preferences given above for the waterproofing layer apply also to the first and second waterproofing layers of the multi-ply membrane. The first and second waterproofing layers are preferably directly bonded to each other over at least part of their opposing major surfaces, i.e. at least part of the second major surface of the first waterproofing layer is directly bonded to at least part of the first major surface of the second waterproofing layer. The composition of first and second waterproofing layers may be same or different. Furthermore, the multi-ply membrane may comprise a top-coating covering at least part of the first major surface of the first waterproofing layer.

The thickness of the waterproofing membrane depends on the intended use of the sealing device and whether the waterproofing membrane is a single-ply or a multi-ply membrane. According to one or more embodiments, the waterproofing membrane has a thickness, determined by using the measurement method as defined in DIN EN 1849-2 standard, of 0.25-7.5 mm, preferably 0.35-5.0 mm, more preferably 0.5-3.5 mm, most preferably 0.5-2.5 mm.

The sealing device is typically provided in a form of a prefabricated membrane article, which is delivered to the construction site and unwound from rolls to provide sheets having a width of 1-5 m and length of several times the width. However, the sealing device can also be used in the form of strips having a width of typically 1-20 cm, for example so as to seal joints between two adjacent membranes. Moreover, the sealing device can also be provided in the form of planar bodies, which are used for repairing damaged locations in existing adhered waterproofing or roof systems.

The preferences given above for the waterproofing membrane, the sealant layer, the adhesive layer, the waterproofing layer, the layer of fiber material, and to the release liner apply equally to all aspects of the present invention unless otherwise stated.

Another subject of the present invention is a method for producing a sealing device according to the present invention, the method comprising steps of:
i) Providing a waterproofing membrane having a first and a second primary exterior surface,
ii) Heating an adhesive sealant composition to allow the composition to flow,
iii) Applying the heated adhesive sealant composition on the second primary exterior surface of the waterproofing membrane such that the second primary exterior surface of the waterproofing membrane is at least partially covered by a sealant layer, and
iv) Applying an adhesive composition on the outer major surface of the sealant layer such that the outer major surface of the sealant layer is partially covered with an adhesive layer, wherein the adhesive sealant composition comprises:
a) At least one elastomer,
b) At least one at 25° C. liquid polyolefin resin, and
c) At least one inert mineral filler.

The heated adhesive sealant composition and adhesive composition may be applied to the respective surfaces using any conventional techniques such as slot die coating, extrusion coating, roller coating, direct gravure coating, offset gravure coating, reverse gravure roll coating, powder dispersion, or spray lamination techniques. The temperature to which the adhesive sealant composition is heated in in step ii) depends on the embodiment of the sealing device. It may be preferred that the adhesive sealant composition is heated to a temperature in the range of 60-250° C., such as 70-225° C., in particular 80-200° C.

According to one or more embodiments, the adhesive composition is a hot-melt pressure sensitive adhesive composition and the method comprises steps of:
i) Providing a waterproofing membrane having a first and second primary exterior surfaces,
ii) Heating an adhesive sealant composition and an adhesive composition to allow the compositions to flow, and
iii) Applying the heated adhesive sealant composition on the second primary exterior surface of the waterproofing membrane such that the second primary exterior surface of the waterproofing membrane is at least partially covered by a sealant layer, and
iv) Applying the heated adhesive composition on the outer major surface of the sealant layer such that the outer major surface of the sealant layer is partially covered with an adhesive layer.

It may be preferred that the adhesive composition is heated to a temperature in the range of 60-250° C., such as 70-225° C., in particular 80-200° C.

According to one or more embodiments, the adhesive composition is an acrylic-based UV-curable pressure sensitive adhesive composition, preferably an acrylic-based UV-curable hot-melt pressure sensitive adhesive composition and the method comprises steps of:
i) Providing a waterproofing membrane having a first and second primary exterior surfaces,
ii) Heating an adhesive sealant composition and an adhesive composition to allow the compositions to flow, and
iii) Applying the heated adhesive sealant composition on the second primary exterior surface of the waterproofing membrane such that the second primary exterior surface of the waterproofing membrane is at least partially covered by a sealant layer, and iv) Applying the heated adhesive composition on the outer major surface of the sealant layer such that the outer major surface of the sealant layer is partially covered with an adhesive layer, and v) Subjecting adhesive layer to UV-radiation to effect cross-linking of the adhesive composition.

According to one or more embodiments, the adhesive layer is subjected in the UV curing step v) of the method to a UV dosage in the range of 30-500 mJ/cm$^2$, preferably of 35-400 mJ/cm$^2$, more preferably 40-350 mJ/cm$^2$, still more preferably 45-300 mJ/cm$^2$. According to one or more embodiments, the adhesive layer is subjected in the UV curing step v) of the method to a UV intensity of at least 150 mW/cm$^2$, preferably at least 250 mW/cm$^2$, more preferably at least 350 mW/cm$^2$, such as in the range of 150-750 mW/cm$^2$, preferably 200-650 mW/cm$^2$, more preferably 250-550 mW/cm$^2$. According to one or more embodiments, the energy supplied to the adhesive layer in the UV curing step v) of the method is in the form of UV-C electromagnetic radiation having a wave length of from about 100 to about 280 nm, preferably 150-270 nm, more preferably 200-260 nm.

The waterproofing membrane can be produced by using any conventional means, such as by way of extrusion or co-extrusion, calendaring, or by spread coating. The further details of the method for producing the sealing device depend on the embodiment of the sealing device, in particular whether the waterproofing membrane is a single-ply or multi-ply membrane or a single-ply fiber layer-backed membrane.

According to one or more embodiments, the waterproofing membrane is a single-ply membrane comprising exactly one waterproofing layer and step i) of the method for producing a sealing device comprises steps of:

i') Extruding a composition of the waterproofing layer though an extruder die and ii') Optionally employing spaced apart calender cooling rolls through which the extruded shaped article obtained in step i') is drawn.

In the extrusion step i'), a thermoplastic composition comprising the constituents of the waterproofing layer is first melt-processed in an extruder to produce a homogenized melt, which is then extruded through the extruder die. Suitable extrusion apparatuses comprising at least one extruder and an extruder die are well known to a person skilled in the art. Any conventional extruders, for example, a ram extruder, single screw extruder, or a twin-screw extruder may be used.

Preferably, the extruder is a screw extruder, more preferably a twin-screw extruder.

According to one or more embodiments, the waterproofing membrane is a fiber layer-backed single-ply membrane and the step i) of the method for producing a sealing device comprises steps of:

i') Providing a layer of fiber material having a first and a second major surface, ii') Extruding a composition of the waterproofing layer though an extruder die onto the first major surface of the layer of fiber material to form a fiber layer-backed waterproofing layer, ii') Optionally employing spaced apart calender cooling rolls through which the fiber layer-backed waterproofing layer obtained in step ii') is drawn, In these embodiments, the outer major surface of the layer of fiber material facing away from the waterproofing layer constitutes the second primary exterior surface of the waterproofing membrane to which the heated adhesive sealant composition is applied in step iii) of the method.

The adhesive sealant composition, the adhesive composition, the waterproofing layer, and the layer of fiber material have their preferred embodiments as discussed above related to the sealing device of the present invention.

Another subject of the present invention is a method for waterproofing a substrate, the method comprising steps of:

I) Providing one or more sealing devices according to the present invention,

II) Applying the sealing device(s) on a surface of the substrate to be waterproofed such that a portion of the outer major surface of the sealant layer and at least a portion of the outer major surface of the adhesive layer are directly contacted with the surface of the substrate, and III) Pressing sealing device(s) against the surface of the substrate with a pressure sufficient to affect adhesive bonding between the sealing device(s) and the substrate.

According to one or more embodiments, the method for waterproofing a substrate comprises steps of:

I') Providing at least two sealing devices according to the present invention,

II') Applying the sealing devices on the surface of the substrate to be waterproofed such that a portion of the outer major surface of the sealant layer and at least a portion of the outer major surface of the adhesive layer are directly contacted with the surface of the substrate and such that the edges of adjacent sealing devices are overlapped to form lapped joints, and III') Pressing the sealing devices against the surface of the substrate with a pressure sufficient to affect adhesive bonding between the sealing devices and the substrate and between the edges of adjacent sealing devices.

Still another subject of the present invention is a waterproofed substrate comprising a substrate (7) and a sealing device (1) according to the present invention, wherein at least a portion of the second primary exterior surface of the waterproofing membrane (2) is bonded to a surface of the substrate via the sealant layer (3) and/or via the adhesive layer (4).

The substrate can be any structural or civil engineering structure, which is to be sealed against moisture and water, such as a hardened concrete structure, insulation board, a cover board, or an existing waterproofing or roofing membrane.

According to one or more embodiments, at least 50%, preferably at least 75%, most preferably at least 85%, of the second primary exterior surface of the waterproofing membrane is bonded to the surface of the substrate via the sealant layer and/or via the adhesive layer. According to one or more embodiments, substantially the entire area of the second primary exterior surface of the waterproofing membrane is bonded to the surface of the substrate via the sealant layer and/or via the adhesive layer.

DETAILED DESCRIPTION OF THE DRAWINGS

FIG. 1 shows a perspective view of the sealing device (1) comprising a waterproofing membrane (2) having a width (w) defined between opposite longitudinally extending edges (e1, e2), a sealant layer (3) covering substantially the entire area of the second primary exterior surface of the waterproofing membrane (2) and an adhesive layer (4) covering a portion of the outer major surface of the sealant layer (3). In this embodiment, the adhesive layer (4) is coated on the outer major surface of the sealant layer (3) in form of one single adhesive segment.

Figure 2:
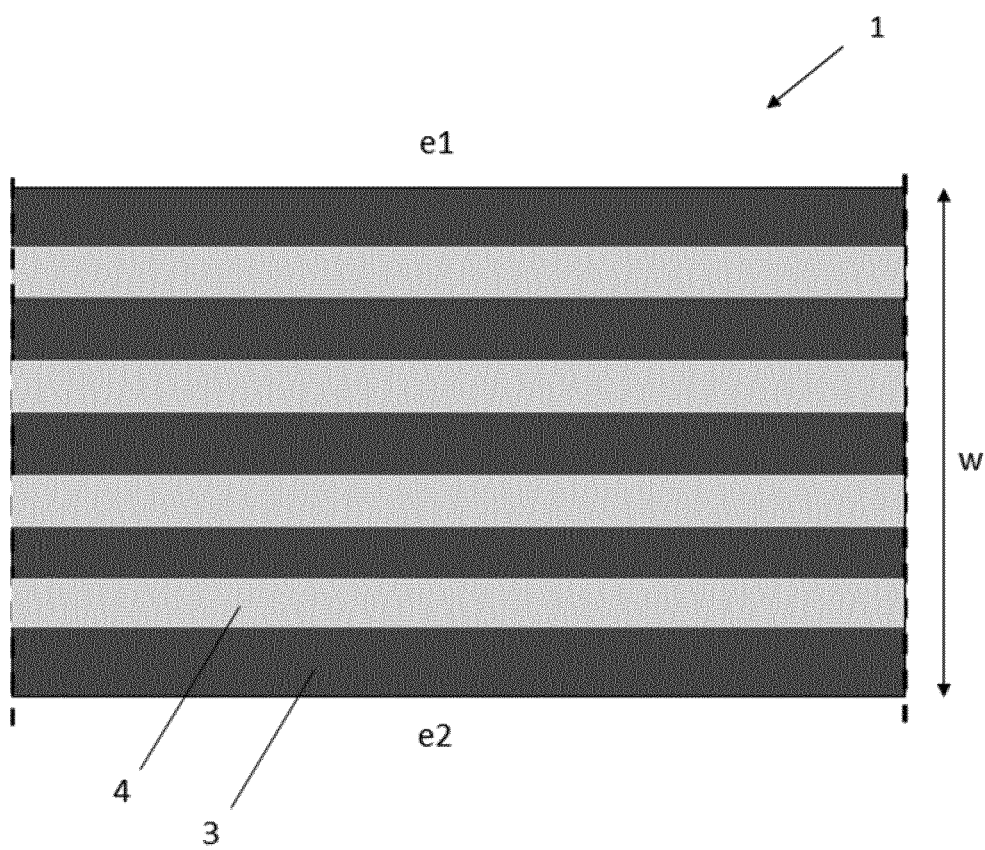
FIG. 2 shows a perspective view (directly from above) of a sealing device (1), wherein the adhesive layer (4) is coated on the outer major surface of the sealant layer (3) in form of continuous adhesive stripes extending in the longitudinal direction of the waterproofing membrane (2).

FIG. 2 shows a perspective view (directly from above) of a sealing device (1) comprising a waterproofing membrane (2), a sealant layer (3) covering substantially the entire second primary exterior surface of the waterproofing membrane (2), and an adhesive layer (4) coated on the outer major surface of the sealant layer (3) in form of continuous adhesive stripes extending in the longitudinal direction of the waterproofing membrane (2). The width of the continuous adhesive stripes and distance between the stripes remains constant in the longitudinal direction of the waterproofing membrane (2).

Figure 3:
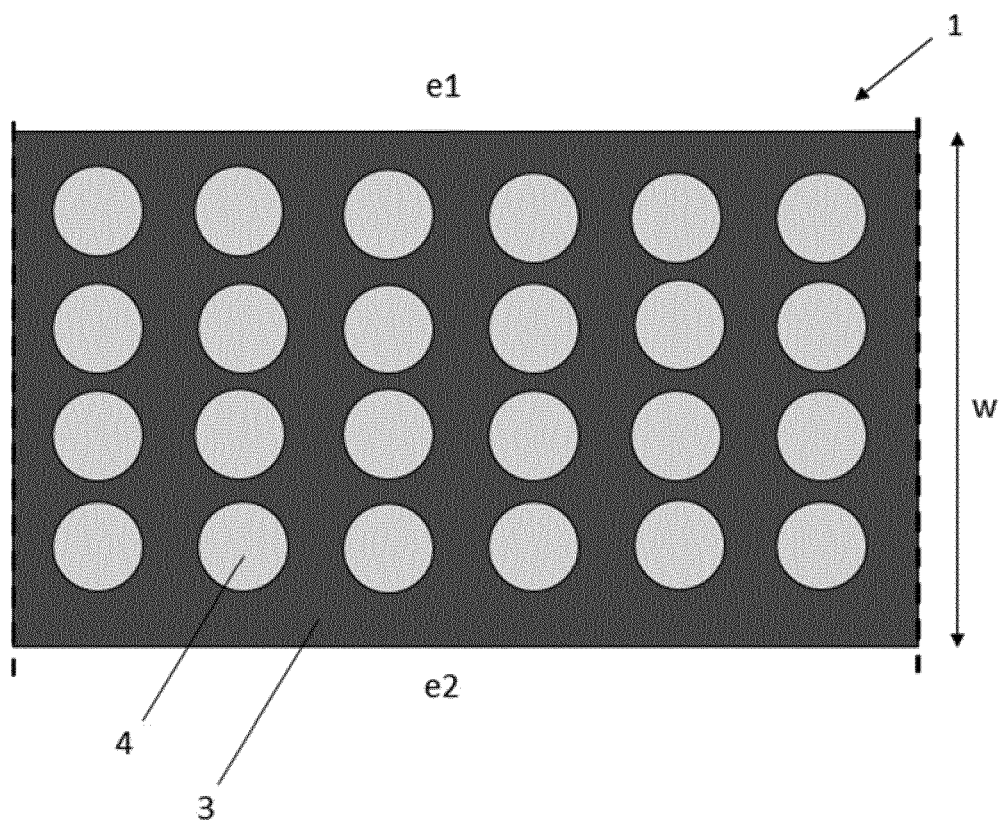
FIG. 3 shows a perspective view (directly from above) of a sealing device (1) wherein the adhesive layer (4) consists of discontinuous spaced-apart adhesive segments coated on the outer major surface of the sealant layer (3) and having a circular shape.

FIG. 3 shows a perspective view (directly from above) of a sealing device (1) comprising a waterproofing membrane (2), a sealant layer (3) covering substantially the entire second primary exterior surface of the waterproofing membrane (2), and an adhesive layer (4) consisting of discontinuous spaced-apart adhesive segments having a circular shape. The spaced-apart discontinuous adhesive segments have substantially the same size and they line up in rows.

Figure 4:
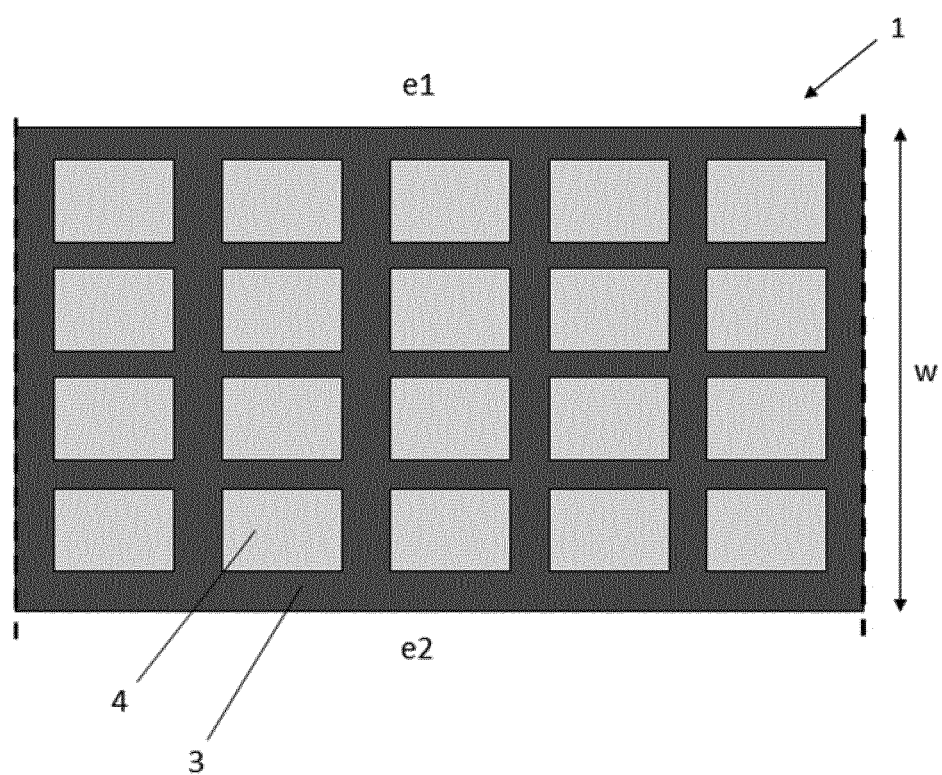
FIG. 4 shows a perspective view (directly from above) of a sealing device (1), wherein the adhesive layer (4) consists of discontinuous spaced-apart adhesive segments coated on the outer major surface of the sealant layer (3) and having a circular shape.

FIG. 4 shows a perspective view (directly from above) of a sealing device (1) comprising a waterproofing membrane (2), a sealant layer (3) covering substantially the entire second primary exterior surface of the waterproofing membrane (2) an adhesive layer (4) consisting of discontinuous spaced-apart adhesive segments having a rectangular shape. The spaced-apart discontinuous adhesive segments have substantially the same size and they line up in rows.

Figure 5:
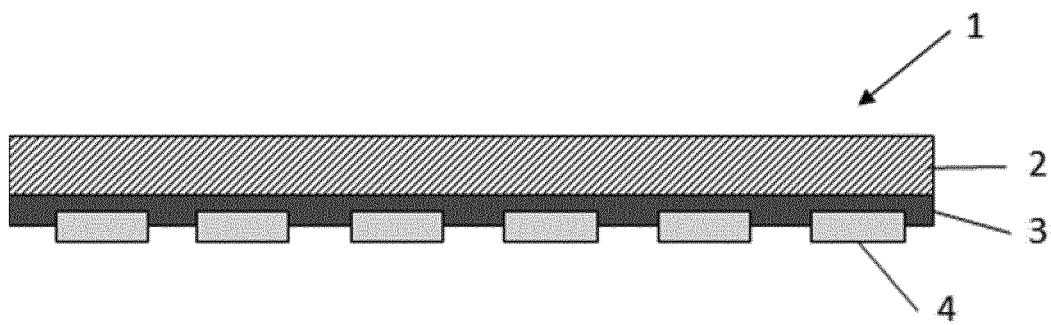
FIG. 5 shows a cross-section of a sealing device (1) comprising a waterproofing membrane (2), a sealant layer (3) covering a portion of the second primary exterior surface of the waterproofing membrane (2) and an adhesive layer (4) covering a portion of the outer major surface of the sealant layer (3), wherein the adhesive layer (4) is partially embedded into the sealant layer (3).

FIG. 5 shows a cross-section of a sealing device (1) comprising a waterproofing membrane (2), a sealant layer (3) covering a portion of the second primary exterior surface of the waterproofing membrane (2), and an adhesive layer (4) covering a portion of the outer major surface of the sealant layer (3). In this embodiment, the adhesive layer (4) is partially embedded into the sealant layer (3) such that the plane of the outer major surface of the adhesive layer lies above the plane of the outer major surface of the sealant layer. The waterproofing membrane (2) is a singly-ply membrane and the sealant layer (3) and the waterproofing membrane (2) are directly connected to each other over their opposing major surfaces. Furthermore, the sealant layer (3) and the adhesive layer (4) are directly connected to each other over their opposing major surfaces.

Figure 6:
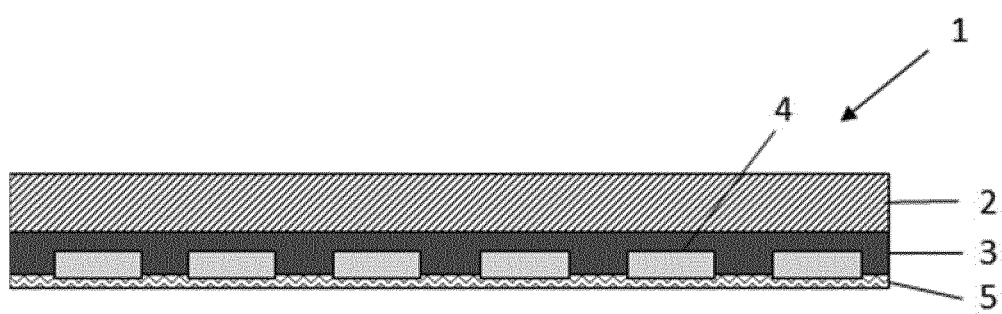
FIG. 6 shows a cross-section of a sealing device (1) according to one embodiment of the sealing device presented in FIG. 5. In this embodiment, the sealing device (1) further comprises a release liner (5), which covers a portion of the outer major surface of the sealant layer (3) and substantially the entire area of the outer major surface of the adhesive layer (4).

FIG. 6 shows a cross-section of a sealing device (1) according to one embodiment of the sealing device presented in FIG. 5. In this embodiment, the sealing device (1) further comprises a release liner (5), which covers a portion of the outer major surface of the sealant layer (3) and substantially the entire area of the outer major surface of the adhesive layer (4).

Figure 7:
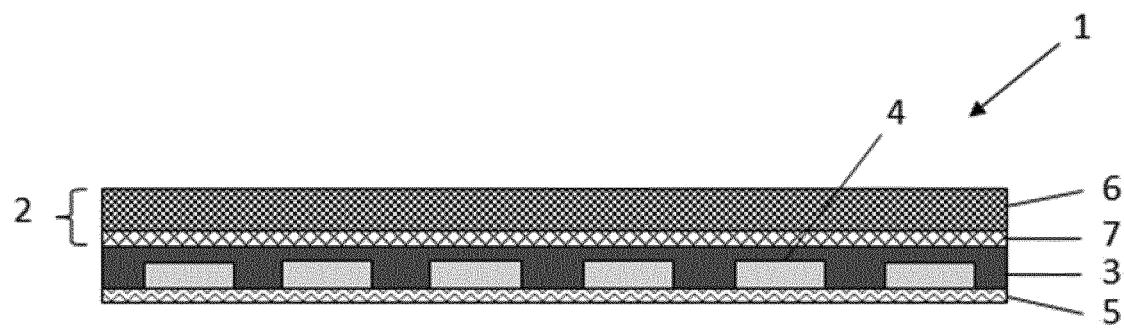
FIG. 7 shows a cross-section of a sealing device (1) according to one embodiment of the sealing device presented in FIG. 6. In this embodiment, the waterproofing membrane (2) is composed of a waterproofing layer (6) and a layer of fiber material (7), which covers substantially the entire area of the second major surface of the waterproofing layer (6), wherein the layer of fiber material (7) is positioned between the waterproofing layer (6) and the sealant layer (3).

FIG. 7 shows a cross-section of a sealing device (1) according to one embodiment of the sealing device presented in FIG. 6. In this embodiment, the waterproofing membrane (2) is composed of a waterproofing layer (6) having a first and a second major surface and a layer of fiber material (7), which covers substantially the entire area of the second major surface of the waterproofing layer (6). The layer of fiber material (7) is positioned between the waterproofing layer (6) and the sealant layer (3). In this embodiment, the layer of fiber material (7) and the sealant layer (3) are directly connected to each other over their opposing major surfaces and the outer major surface of the layer of fiber material (7) facing away from the second major surface of the waterproofing layer (6) forms the second primary exterior surface of the waterproofing membrane (2).

Figure 8:
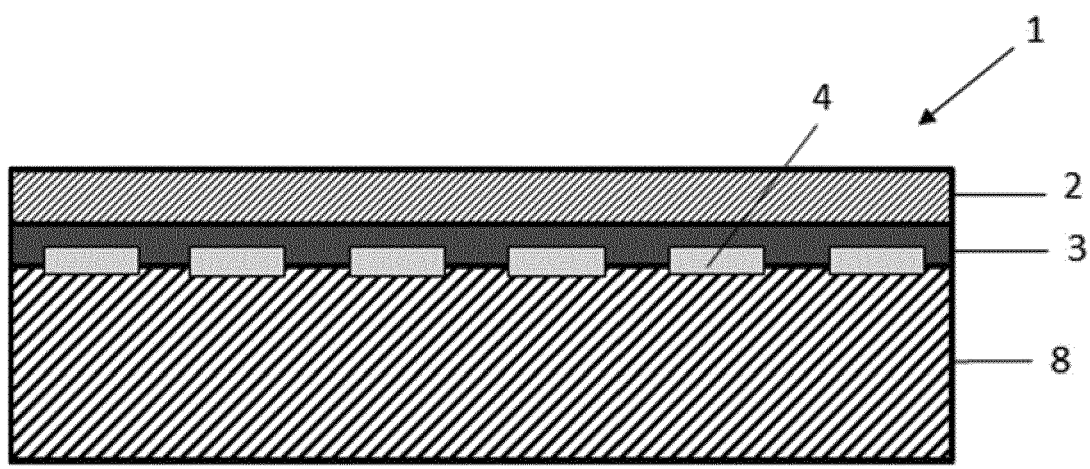
FIG. 8 shows a cross-section of a waterproofed substrate comprising a substrate (8) and a sealing device (1), wherein substantially the entire area of the second primary exterior surface of the waterproofing membrane (2) is bonded to a surface of the substrate (8) via the sealant layer (3) and via the adhesive layer (4).

FIG. 8 shows a cross-section of a waterproofed substrate comprising a substrate (8) and a sealing device (1), wherein substantially the entire area of the second primary exterior surface of the waterproofing membrane (2) is bonded to a surface of the substrate (8) via the sealant layer (3) and via the adhesive layer (4).

EXAMPLES

The following materials were used in the examples:
LDPE-film having a thickness of 300 μm: 7709 from Infiana Germany GmbH & Co. KG
First adhesive sealant: SikaLastomer®-68 (from Sika USA)
Second adhesive sealant: Butyl H-35 (From FAIST-ChemTec GmbH)
Hot-melt pressure sensitive adhesive (HM-PSA): Sika-Melt®-9209 (from Sika AG)
UV-curable acrylic-based pressure sensitive adhesive: Acrylic-based PSA with medium AC-resin (from BASF)
Build-Up of Sealing Devices The sealing device of reference example 1 (Ref-1) comprises the LDPE-film and a continuous layer of the first adhesive sealant covering substantially the entire area of one of the major surfaces of the LDPE-film. The first adhesive sealant was coated on the surface of the LDPE-foil with a thickness of ca. 1.5 mm.

The sealing device of reference example 2 (Ref-2) comprises the LDPE-film and a continuous layer of the hot-melt pressure sensitive adhesive covering substantially the entire area of one of the major surfaces of the LDPE-film. The hot-melt pressure sensitive adhesive was coated on the surface of the LDPE-film with a coating weight of ca. 200 g/m$^2$.

The sealing device of example 1 (Ex-1) has the same basic structure as the sealing device of reference example Ref-1 and additionally a layer of the hot-melt pressure sensitive adhesive covering 40% of the outer major surface of the adhesive sealant layer. The adhesive layer was coated on the outer major surface of the adhesive sealant layer in form of a discontinuous pattern of rectangular spaced-apart adhesive segments. The rectangular adhesive segments had dimensions of ca. 15 mm×20 mm (length×width) and they were arranged in straight rows running in the longitudinal and transverse direction of the sealing device. The discontinuous pattern of the adhesive segments corresponds to the one used in the sealing device of FIG. 4. The adhesive layer had a total coating weight of ca. 200 g/m$^2$ taking also into account in the calculation the areas that were not covered by the adhesive layer.

The sealing device of example 2 (Ex-2) presents another embodiment of the sealing device of Ex-1. In this case, the layer of the hot-melt pressure sensitive adhesive covered 60% of the outer major surface of the sealant layer. The rectangular discontinuous spaced-apart adhesive segments had dimensions of ca. 15 mm×27 mm and the distance between the rows of adhesive segments was decreased in order to reach the desired 60% coverage. The adhesive layer was coated on the outer major surface of the sealant layer with the same coating weight of ca. 200 g/m$^2$ as in example Ex-1. Consequently, the thickness of the adhesive layer was somewhat smaller compared to sealing device of example Ex-2.

The sealing device of reference example 3 (Ref-3) comprises the LDPE-film and a continuous layer of at least partially crosslinked acrylic-based pressure sensitive adhesive covering substantially the entire area of one of the major surfaces of the LDPE-film. The UV-curable acrylic-based pressure sensitive adhesive was coated on the surface of the LDPE-film with a coating weight of ca. 100 g/m$^2$ and then subjected to UV-irradiation to affect at least partial crosslinking of the UV-curable acrylic-based pressure sensitive adhesive.

The sealing device of example 3 (Ex-3) comprises a continuous layer of the first adhesive sealant covering substantially the entire area of one of the major surfaces of the LDPE-film and a continuous layer of at least partially crosslinked acrylic-based pressure sensitive adhesive covering substantially the entire area of the outer major surface of the layer of the first adhesive sealant. The first adhesive sealant was coated on the surface of the LDPE-foil with a coating weight of 1200 g/m². The UV-curable acrylic-based pressure sensitive adhesive was then coated on the outer major surface of the layer of the first adhesive sealant with coating weight of ca. 100 g/m² and subjected to UV-irradiation to affect at least partial crosslinking of the UV-curable acrylic-based pressure sensitive adhesive.

The sealing device of reference example 4 (Ref-4) comprises the LDPE-film and a continuous layer of the second adhesive sealant covering substantially the entire area of one of the major surfaces of the LDPE-film. The second adhesive sealant was coated on the surface of the LDPE-film with a coating weight of ca. 1200 g/m².

The sealing device of example 4 (Ex-4) comprises a continuous layer of the second adhesive sealant covering substantially the entire area of one of the major surfaces of the LDPE-film and a continuous layer of at least partially crosslinked acrylic-based pressure sensitive adhesive covering substantially the entire area of the outer major surface of the layer of the first adhesive sealant. The second adhesive sealant was coated on the surface of the LDPE-foil with a coating weight of 1200 g/m². The UV-curable acrylic-based pressure sensitive adhesive was then coated on the outer major surface of the layer of the first adhesive sealant with coating weight of ca. 100 g/m² and subjected to UV-irradiation to affect at least partial crosslinking of the UV-curable acrylic-based pressure sensitive adhesive.

Adhesive Bond Strength

Adhesive bond strength of the sealing devices was tested by measuring average peel resistances obtained upon peeling a sealing device from a surface of a substrate (wood, fiber reinforced concrete, and zinc plate) on which the sealing device had been adhesively adhered. The adhesive bond strengths were measured:
as "initial adhesion", i.e. one hour after the sealing device had been adhered to the substrate
after one day, one week, and two weeks of storing of the adhered sealing device at normal room temperature of 23° C., and
after one day, one week, and two weeks of storing the adhered sealing device at an elevated temperature of 50° C. or 70° C.

The peel resistances were measured using the method as defined in EN DIN 1372 standard and using a Zwick tensile testing apparatus equipped with a 90°-peeling device. In the peel resistance measurements, a sample strip of the tested sealing device was peeled off at a peeling angle of 90° and a constant cross beam speed of 100 mm/min. The average peel resistance was calculated as average peel force per unit width of the strip [N/50 mm] during peeling over a length of approximately 10 cm excluding the first and last fifth of the total peeling length from the calculation. The average peel resistance values shown in Table 1 and Table 2 were calculated as an average of measured values obtained with two similar sealing devices.

TABLE 1

| Structure of membrane | [a]Ref-1 | [b]Ref-2 | [c]Ex-1 | [d]Ex-2 |
|---|---|---|---|---|
| Peel resistance from wood [N/50 mm] | | | | |
| Initial @RT | 11 | 51 | 50 | 60 |
| After 1 day @RT | 22 | — | 58 | 70 |
| After one week @RT | 17 | — | 57 | 72 |
| After one week @50° C. | 31 | — | 68 | 73 |
| Peel resistance from FRC* [N/50 mm] | | | | |
| Initial @RT | 35 | 66 | 56 | 63 |
| After 1 day @RT | 56 | — | 73 | 69 |
| After one week @RT | 66 | — | 76 | 69 |
| After one week @50° C. | 128 | — | 91 | 81 |
| Peel resistance from zinc plate [N/50 mm] | | | | |
| Initial @RT | 82 | 120 | 67 | 50 |
| After 1 day @RT | 108 | — | 77 | 56 |
| After one week @RT | 117 | — | 75 | 57 |
| After one week @50° | 117 | — | 90 | 72 |

[a]First adhesive sealant,
[b]100% HM-PSA,
[c]First adhesive sealant with 40% HM-PSA,
[d]First adhesive sealant with 60% HM-PSA
*Fiber reinforced concrete

TABLE 2

| Structure of membrane | [e]Ref-3 | [f]Ex-3 | [g]Ref-4 | [h]Ex-4 |
|---|---|---|---|---|
| Peel resistance from wood [N/50 mm] | | | | |
| Initial @RT | 40 | 134 | — | — |
| After 1 day @RT | 42 | 131 | — | — |
| After one week @RT | 41 | 171 | — | — |
| After two weeks @RT | 40 | 124 | — | — |
| Initial @70° C. | 40 | 134 | 31 | 59 |
| After 1 day @70° C. | 18 | 102 | 58 | 59 |
| After one week @70° C. | 11 | 112 | 63 | 67 |
| After two weeks @70° C. | 9 | 124 | 65 | 64 |
| Peel resistance from zinc plate [N/50 mm] | | | | |
| Initial @RT | 34 | 127 | — | 83 |
| After 1 day @RT | 31 | 139 | — | — |
| After one week @RT | 28 | 137 | — | 87 |
| After two weeks @RT | 29 | 121 | — | — |
| Initial @70° C. | 34 | 127 | 84 | 72 |
| After 1 day @70° C. | 10 | 108 | 88 | 88 |
| After one week @70° C. | 6 | 108 | 101 | 91 |
| After two weeks @70° C. | 5 | 109 | — | — |

[e]100% acrylate-based PSA,
[f]First adhesive sealant with 100% acrylate-based PSA,
[g]100% second adhesive sealant,
[h]Second adhesive sealant with 100% acrylate-based PSA

The invention claimed is:

1. A sealing device comprising:
   i. a waterproofing membrane having a first and a second primary exterior surface and a width defined between opposite longitudinally extending edges,
   ii. a sealant layer covering at least a portion of the second primary exterior surface of the waterproofing membrane, and
   iii. an adhesive layer covering a portion of an outer major surface of the sealant layer,
   wherein:
   the sealant layer is composed of an adhesive sealant composition comprising:
   a) at least one elastomer,
   b) at least one polyolefin resin that is liquid at 25° C., and c) at least one inert mineral filler, and the adhesive sealant composition further comprises at least one hydrocarbon resin that is solid at 25° C., the hydrocarbon resin having a softening point measured by Ring and Ball method according to DIN EN 1238 in a range of 65-200° C. and/or a glass transition temperature determined by differential scanning calorimetry method according to ISO 11357 standard using a heating rate of 2° C./min of at or above 0° C.

2. The sealing device according to claim 1, wherein the at least one polyolefin resin that is liquid at 25° C. is selected from the group consisting of polybutenes and polyisobutylenes that have an average molecular weight of not more than 5,000 g/mol and are liquid at 25° C.

3. The sealing device according to claim 1, wherein the adhesive sealant composition comprises less than 15 wt.-% of water-swellable mineral fillers, based on the total weight of the adhesive sealant composition.

4. The sealing device according to claim 1, wherein the sealant layer covers substantially the entire area of the second primary exterior surface of the waterproofing membrane and/or wherein the adhesive layer covers 5-90% of the outer major surface of the sealant layer.

5. The sealing device according to claim 1, wherein the adhesive layer is in a form of a single adhesive segment coated on the outer major surface of the sealant layer or wherein the adhesive layer is in a form of two or more continuous, longitudinally or transversely extending adhesive stripes coated the outer major surface of the sealant layer.

6. The sealing device according to claim 1, wherein the adhesive layer is in a form of discontinuous spaced-apart adhesive segments coated on the outer major surface of the sealant layer.

7. The sealing device according to claim 6, wherein at least one of (a)-(d) is satisfied:
(a) the discontinuous spaced-apart adhesive segments have a square or rectangular shape,
(b) the discontinuous spaced-apart adhesive segments line up in rows in a longitudinal and/or transverse direction of the waterproofing membrane,
(c) a distance between two adjacent discontinuous spaced-apart adhesive segments is at least 1.0 mm, and
(d) an average size of the discontinuous spaced-apart adhesive segments is in A range of 100-5,000 mm$^2$.

8. The sealing device according to claim 1, wherein the adhesive layer is partially embedded into to the sealant layer.

9. The sealing device according to claim 1, wherein the sealant layer has a maximum thickness determined by using the measurement method as defined in DIN EN 1849-2 standard in a range of 0.1-5.0 mm and/or the adhesive layer has a maximum thickness determined by using the measurement method as defined in DIN EN 1849-2 standard in a range of 0.1-5.0 mm.

10. The sealing device according to claim 1, wherein the adhesive sealant composition comprises:
a) 1-40 wt.-% of the at least one elastomer,
b) 10-60 wt.-% of the at least one polyolefin resin that is liquid at 25° C., and
c) 5-65 wt.-% of the at least one inert mineral filler, all proportions being based on the total weight of the adhesive sealant composition.

11. The sealing device according to claim 1, wherein the at least one elastomer is selected from the group consisting of ethylene-propylene rubber, butyl rubber, halogenated butyl rubber, ethylene-propylene diene rubber (EPDM), natural rubber, chloroprene rubber, synthetic 1,4-cis-polyisoprene, polybutadiene, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer, and/or the at least one inert mineral filler is selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

12. The sealing device according to claim 1, wherein the adhesive layer is composed of a pressure sensitive adhesive composition.

13. The sealing device according to claim 1, wherein the waterproofing membrane comprises a waterproofing layer having first and second major surfaces.

14. The sealing device according to claim 13, wherein the waterproofing layer has a thickness, determined by using the measurement method as defined in DIN EN 1849-2 standard, in a range of 0.1-5.0 mm.

15. The sealing device according to claim 13, wherein the waterproofing membrane further comprises a layer of fiber material covering at least a portion of the second major surface of the waterproofing layer and positioned between the waterproofing layer and the sealant layer.

16. A method for producing a sealing device according to claim 1, the method comprising:
i) providing the waterproofing membrane having the first and the second primary exterior surface,
ii) heating the adhesive sealant composition to allow the composition to flow,
iii) applying the heated adhesive sealant composition on the second primary exterior surface of the waterproofing membrane such that the second primary exterior surface of the waterproofing membrane is at least partially covered by the sealant layer, and
iv) applying an adhesive composition on the outer major surface of the sealant layer such that the outer major surface of the sealant layer is partially covered with the adhesive layer.

17. A method for waterproofing a substrate, the method comprising:
I) providing the sealing device according to claim 1,
II) applying the sealing device on a surface of the substrate to be waterproofed such that a portion of the outer major surface of the sealant layer and at least a portion of the outer major surface of the adhesive layer are directly contacted with the surface of the substrate, and
III) pressing sealing device against the surface of the substrate with a pressure sufficient to affect adhesive bonding between the sealing device and the substrate.

18. The method according to claim 17, wherein a plurality of sealing devices are applied on and pressed against the surface of the substrate.

19. A waterproofed substrate comprising a substrate and the sealing device according to claim 1, wherein at least portion of the second primary exterior surface of the waterproofing membrane is bonded to a surface of the substrate via the sealant layer and/or via the adhesive layer.

* * * * *